US012755434B2

(12) United States Patent
Hu

(10) Patent No.: US 12,755,434 B2
(45) Date of Patent: Oct. 6, 2026

(54) DATA PROCESSING METHOD FOR POINT CLOUD MEDIA, AND RELATED DEVICE

(71) Applicant: TENCENT TECHNOLOGY (SHENZHEN) COMPANY LIMITED, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/989,557

(22) Filed: Dec. 20, 2024

(65) Prior Publication Data

US 2025/0191230 A1 Jun. 12, 2025

Related U.S. Application Data

(63) Continuation of application No. PCT/CN2023/106292, filed on Jul. 7, 2023.

(30) Foreign Application Priority Data

Aug. 22, 2022 (CN) ......................... 202211007891.4

(51) Int. Cl.
*G06T 9/00* (2006.01)
*H04N 19/132* (2014.01)
(Continued)

(52) U.S. Cl.
CPC ............ *G06T 9/00* (2013.01); *H04N 19/132* (2014.11); *H04N 19/136* (2014.11); *H04N 19/184* (2014.11); *H04N 19/31* (2014.11)

(58) Field of Classification Search
CPC ......... G06T 9/00; G06T 9/001; H04N 19/132; H04N 19/136; H04N 19/184; H04N 19/31;
(Continued)

(56) References Cited

U.S. PATENT DOCUMENTS

2021/0029187 A1 1/2021 Oh
2021/0320962 A1 10/2021 Oh
(Continued)

FOREIGN PATENT DOCUMENTS

CN 112804256 A 5/2021
CN 113766271 A 12/2021
(Continued)

OTHER PUBLICATIONS

International Search Report for International Application No. PCT/CN2023/106292 dated Oct. 7, 2023.
(Continued)

*Primary Examiner* — Nasim N Nirjhar
(74) *Attorney, Agent, or Firm* — Sughrue Mion, PLLC

(57) ABSTRACT

A data processing method and apparatus for point cloud media including obtaining a media file of point cloud media, the media file comprising a point cloud code stream of the point cloud media, an attribute parameter set, and attribute parameter set indication information, the attribute parameter set comprising parameter information required by decoding of attribute data in the point cloud code stream, and the attribute parameter set indication information indicating an encapsulation position of the attribute parameter set, and decoding the point cloud code stream according to the attribute parameter set indication information to present the point cloud media.

18 Claims, 5 Drawing Sheets

(51) Int. Cl.

| | |
|---|---|
| ***H04N 19/136*** | (2014.01) |
| ***H04N 19/184*** | (2014.01) |
| ***H04N 19/31*** | (2014.01) |

(58) Field of Classification Search

CPC .... H04N 19/597; H04N 19/70; H04N 21/816; H04N 21/85406; H04N 13/161; H04N 13/282; H04N 19/42; H04L 65/61; H04L 65/70; H04L 65/60

See application file for complete search history.

(56) References Cited

U.S. PATENT DOCUMENTS

| | | | | |
|---|---|---|---|---|
| 2021/0329052 | A1* | 10/2021 | Oh | H04L 65/762 |
| 2022/0337846 | A1* | 10/2022 | Ouedraogo | H04N 21/8451 |
| 2023/0045663 | A1* | 2/2023 | Hur | H04N 19/537 |
| 2023/0164371 | A1* | 5/2023 | Denoual | H04N 19/188<br>725/116 |

FOREIGN PATENT DOCUMENTS

| | | | |
|---|---|---|---|
| CN | 115396646 | A | 11/2022 |
| WO | 2021/262623 | A1 | 12/2021 |
| WO | 2022/148650 | A1 | 7/2022 |

OTHER PUBLICATIONS

Written Opinion for International Application No. PCT/CN2023/106292 dated Oct. 7, 2023.

Ying Hu et al., "On Attribute Parameter set Indication for G-PCC Carriage," International Organisation for Standardisation, ISO/IEC JTC 1/SC 29/WG 3, Coding of Moving Pictures and Audio, Mainz, DE; Oct. 2022, 6 pages.

Extended European Search Report dated Nov. 12, 2025, issued in EP Application No. 23856328.2.

* cited by examiner

DATA PROCESSING METHOD FOR POINT CLOUD MEDIA, AND RELATED DEVICE

CROSS-REFERENCE TO RELATED APPLICATIONS

This application is a continuation application of International Application No. PCT/CN2023/106292 filed on Jul. 7, 2023, which claims priority to Chinese Patent Application No. 202211007891.4, filed with the China National Intellectual Property Administration on Aug. 22, 2022, the disclosures of each being incorporated by reference herein in their entireties.

FIELD

The disclosure relates to the field of communication technologies, and specifically, to data processing of point cloud media.

BACKGROUND

With the continuous development of a point cloud technology, compression encoding of point cloud media has become an important research issue. From a current compression encoding technology of the point cloud media, in a definition of attribute parameters in a point cloud code stream, an attribute parameter set is allowed to contain parameter information required by decoding of a plurality of groups of attribute data. However, there are still some problems in the compression encoding technology of the point cloud media at present. For example, unnecessary encoding and decoding dependencies and a waste of resources on a decoding side in a process of supporting partial transmission or partial decoding are easily caused. Therefore, how to improve an attribute encoding technology has become important in the field of point cloud encoding technologies.

SUMMARY

Some embodiments provide a data processing method for point cloud media, performed by at least one processor, the method including: obtaining a media file of point cloud media, the media file comprising a point cloud code stream of the point cloud media, an attribute parameter set, and attribute parameter set indication information, the attribute parameter set comprising parameter information required by decoding of attribute data in the point cloud code stream, and the attribute parameter set indication information indicating an encapsulation position of the attribute parameter set; and decoding the point cloud code stream according to the attribute parameter set indication information to present the point cloud media.

Some embodiments provide a data processing apparatus for point cloud media, the apparatus including: at least one memory configured to store computer program code; at least one processor configured to read the program code and operate as instructed by the program code, the program code comprising: obtaining code configured to cause the at least one processor to obtain a media file of point cloud media, the media file comprising a point cloud code stream of the point cloud media, an attribute parameter set, and attribute parameter set indication information, the attribute parameter set comprising parameter information required by decoding of attribute data in the point cloud code stream, and the attribute parameter set indication information indicating an encapsulation position of the attribute parameter set; and processing code configured to cause the at least one processor to decode the point cloud code stream according to the attribute parameter set indication information to present the point cloud media.

Some embodiments provide a non-transitory computer-readable storage medium, storing computer code which, when executed by at least one processor, causes the at least one processor to at least: obtain a media file of point cloud media, the media file comprising a point cloud code stream of the point cloud media, an attribute parameter set, and attribute parameter set indication information, the attribute parameter set comprising parameter information required by decoding of attribute data in the point cloud code stream, and the attribute parameter set indication information indicating an encapsulation position of the attribute parameter set; and decode the point cloud code stream according to the attribute parameter set indication information to present the point cloud media.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1A:
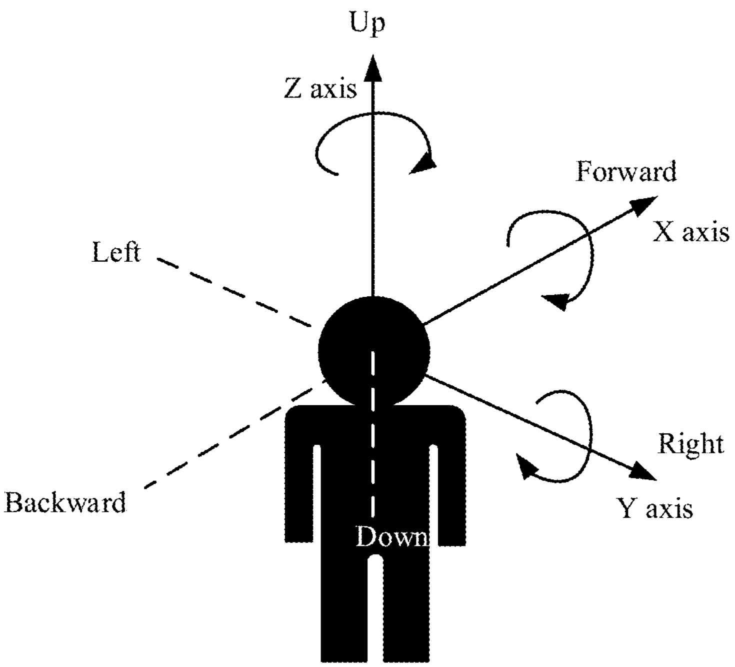
FIG. 1A is a schematic diagram of a 6-Degree of Freedom (6DoF) according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

The terms "first", "second", and the like used herein are used for distinguishing identical or similar items that have essentially the same effects and functions. There is no logical or temporal dependency relationship between "first", "second", and "nth", and there is no limitation on quantities and execution orders.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C.".

Some embodiments provide a data processing method for point cloud media, and a related device, which can indicate an encapsulation position of an attribute parameter set and obtain the attribute parameter set according to the indicated encapsulation position, and can reduce unnecessary encoding and decoding dependencies, achieve transmission, decoding, and presentation of the point cloud media, and optimize network bandwidth and utilization of computation resources of a decoding side.

In some embodiments, a media file of point cloud media is obtained, the media file including a point cloud code stream of the point cloud media and an attribute parameter set. The attribute parameter set includes parameter information required by decoding of attribute data in the point cloud code stream; and the attribute parameter set indication information is configured for indicating an encapsulation position of the attribute parameter set. The encapsulation position of the attribute parameter set can be directly obtained according to the attribute parameter set indication information, and the point cloud code stream can be decoded based on the attribute parameter set to present the point cloud media. Transmission, decoding, and presentation of the point cloud media are guided; unnecessary encoding and decoding dependencies can be reduced; and transmission resources and computation resources can be saved.

Other technical terms will be introduced below:

I. Immersive Media

Figure 1B:
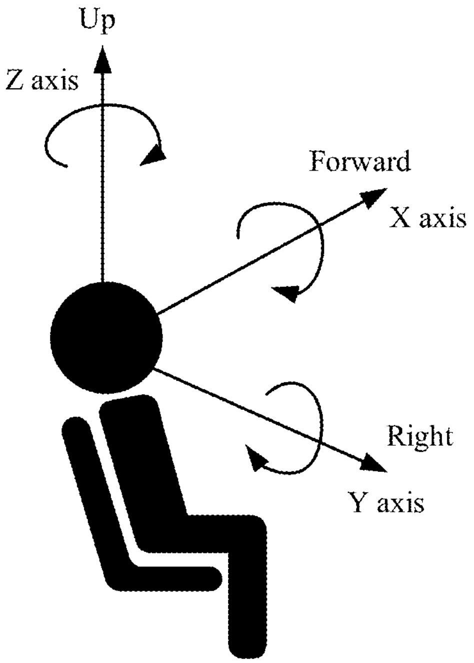
FIG. 1B is a schematic diagram of a 3DoF according to some embodiments.
Figure 1C:
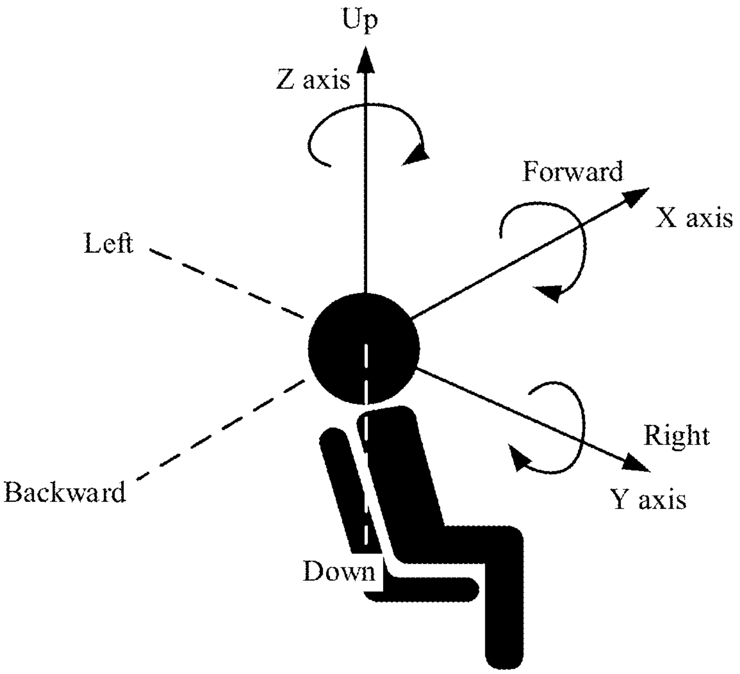
FIG. 1C is a schematic diagram of a 3DoF+ according to some embodiments.

The immersive media refers to a media file that can provide an immersive media content, making a viewer immersed in this media content obtain a sensual experience including the visual sense and the auditory sense in the real world. According to a degree of freedom of the viewer in consuming the media content, the immersive media can be classified into: a 6DoF immersive media, a 3DoF immersive media, and a 3DoF+ immersive media. As shown in FIG. 1A, 6DoF means that the viewer of the immersive media can translate freely along an X axis, a Y axis, and a Z axis. For example, the viewer of the immersive media can walk freely in a three-dimensional 360-degree Virtual Reality (VR) content. Similar to the 6DoF, there are 3DoF and 3DoF+ production technologies. FIG. 1B is a schematic diagram of a 3DoF according to some embodiments. As shown in FIG. 1B, 3DoF means that the viewer of the immersive media is fixed at a center point of a three-dimensional space, and rotates the head along the X axis, the Y axis, and the Z axis to view images provided by the media content. FIG. 1C is a schematic diagram of a 3DoF+ according to some embodiments. As shown in FIG. 1C, 3DoF+ means that when a virtual scene provided by the immersive media has certain depth information, the viewer of the immersive media can move the head within a limited space based on a 3DoF to view images provided by the media content.

II. Point Cloud

The point cloud refers to a randomly distributed discrete point set in a space that express a spatial structure and surface attribute of a three-dimensional object or scene. Each point in the point cloud at least includes geometry data, and the geometry data is configured for representing three-dimensional position information of the point. According to different application scenarios, the point in the point cloud may include one or more groups of attribute data. Each group of attribute data is configured for reflecting an attribute possessed by the point, which can be a color, a material, or other information. Usually, each point in the point cloud has the same quantity of groups of attribute data.

The point cloud can flexibly and conveniently express the spatial structure and surface attribute of the three-dimensional object or scene, so that the point cloud is widely used in a VR game, a computer aided design (CAD), a geography information system (GIS), an autonomous navigation system (ANS), a digital cultural heritage, free viewpoint broadcasting, three-dimensional immersive remote presentation, and three-dimensional reconstruction of biological tissues and organs.

Ways to obtain the point cloud mainly include: computer generation, 3-dimension (3D) laser scanning, 3D photogrammetry, and the like. In some embodiments, the point cloud may be obtained by capturing, by a capturing device (a group of cameras or a camera device with a plurality of lenses and sensors), a visual scene of the real world. Through 3D laser scanning, a point cloud of a 3D object or scene in a static real world can be obtained. A million-class point cloud can be obtained per second. Through 3D photography, a point cloud of a 3D object or scene in a dynamic real world may be obtained, a ten million-class point cloud can be obtained per second. In addition, in the medical field, point clouds of biological tissues and organs may be obtained through magnetic resonance imaging (MRI), computed tomography (CT), and electromagnetic positioning information. For example, the point cloud may be directly generated by a computer according to a virtual 3D object and scene. For example, the computer can generate point clouds of virtual 3D objects and scenes. With the continuous accumulation of large-scale point cloud data, efficient storage, transmission, posting, sharing, and standardization of the point cloud data have become the key to point cloud applications.

III. Point Cloud Media

The point cloud media is a typical 6DoF immersive media. The point cloud media includes a frame sequence composed of one or more frames of point cloud frames, and each frame of the point cloud frame is composed of geometry and attribute data possessed by one or more points in a point cloud. The geometry data may be referred to as three-dimensional position information. The geometry data of a point in the point cloud refers to spatial coordinates (x, y, z) of the point, which can include coordinate values of the point in various coordinate axis directions of a three-dimensional coordinate system, for example, a coordinate value x in an X-axis direction, a coordinate value y in a Y-axis direction, and a coordinate value z in a Z-axis direction. A point in the point cloud may include one or more groups of attribute data, and each group of attribute data is configured for reflecting an attribute possessed by the point. For example, a point in the point cloud has a group of color attribute data. The color attribute data is configured for reflecting a color attribute of the point (such as red and yellow). In some embodiments, a point in the point cloud has a group of reflectivity attribute data. The reflectivity attribute data is configured for reflecting a laser reflection intensity attribute of the point. When a point in the point cloud has a plurality of groups of attribute data, the types of the plurality of groups of attribute data can be the same or different. For example, a point in the point cloud can have one group of color attribute data and one group of reflectivity attribute data. In some embodiments, a point in the point cloud may have two groups of color attribute data. The two groups of color attribute data are configured for reflecting color attributes of the point at different time points.

In some embodiments, each frame of point cloud frame also includes a geometry parameter set corresponding to the geometry data or an attribute parameter set corresponding to the attribute data. The geometry parameter set and the attribute parameter set can form a parameter set. The geometry parameter set may include parameter information required by encoding or decoding of the geometry data in each frame of point cloud frame. The attribute parameter set corresponding to the attribute data may include parameter information required by encoding or decoding of the attribute data in each frame of point cloud frame. To be specific, the point cloud data contained in a frame of point cloud frame in the point cloud media may include the geometry data, the geometry parameter set, one or more groups of attribute data, and one or more groups of attribute parameter sets.

In an Audio Video Coding Standard (AVS) point cloud encoding technology, a point cloud frame usually only includes one point cloud geometry header and one point cloud attribute header (i.e. sequence header). The point cloud geometry header includes a parameter set required by encoding or decoding of the geometry data of a single frame of point cloud frame, and the point cloud attribute header includes a parameter set required by encoding or decoding of the attribute data of a single frame of point cloud frame. To be specific, the point cloud attribute header may include all parameter information corresponding to one or more groups of attribute data in the point cloud frame. In a Moving Picture Expert Group (MPEG) point cloud encoding technology, a geometry parameter set (GPS) and one or more attribute parameter sets (APSs) can be defined in a point cloud code stream corresponding to the point cloud media. An APS can correspond to different types of attribute data in the point cloud frame. In the present embodiment, there is no distinction between the attribute header and APS, and they are described as an attribute parameter set.

IV. Track

The track refers to a media data set in a point cloud media encapsulation process. One track is composed of a plurality of samples with time sequences, and one sample corresponds to one point cloud frame of the point cloud media. An encapsulation mode of the point cloud media includes a single-track mode or a multi-track mode. The single-track mode refers to encapsulating all point cloud data of the point cloud media into the same track. At this time, a media file of the point cloud media only includes one track (i.e. a single track obtained by single-track encapsulation). In the single track obtained by the single-track mode, a sample refers to a point cloud frame in the point cloud media, and a sample includes all data of the corresponding point cloud frame (including the geometry data and the attribute data).

The multi-track mode refers to encapsulating the point cloud data of the point cloud media into a plurality of different tracks. At this time, the media file of the point cloud media may include a plurality of tracks. Further, the multi-track mode may include a type-based multi-track mode. The type-based multi-track mode is to encapsulate a type of data into a component track. For example, if the point cloud media includes geometry data, a group of color attribute data, and a group of reflectivity attribute data, the geometry data may be encapsulated into a geometry component track, the color attribute data may be encapsulated into a color attribute component track, and the reflectivity attribute data may be encapsulated into a reflectivity attribute component track. In any component track obtained through the type-based multi-track mode, a sample only includes partial data of a point cloud frame of the point cloud media. For example, a sample in the geometry component track includes geometry data of a point cloud frame in the point cloud media. A sample in the color attribute component track includes a group of color attribute data of a point cloud frame in the point cloud media. In some embodiments, metadata information may be used as a type of media. A metadata track is included in the media file of the point cloud media. Each component track (such as the geometry component track and the attribute component track) may include one or more samples. Each sample may correspond to one point cloud frame in the point cloud media, and samples corresponding to the same point cloud frame have the same presentation time.

In addition, when the point cloud media includes a parameter set, in the single track obtained by the single-track mode, a sample includes all the data of the corresponding point cloud frame. To be specific, a sample includes the geometry data, the attribute data, and the parameter set of a point cloud frame. The parameter set includes the geometry parameter set and the attribute parameter set. The geometry parameter set includes the parameter information required by the decoding of the geometry data of the point cloud frame. The attribute parameter set includes the parameter information required by the decoding of the attribute data of the point cloud frame. In the type-based multi-track mode, a type of data is encapsulated into a single track, and there may be various encapsulation positions for the parameter set, including but not limited to: (1) The parameter set may be encapsulated into the geometry component track corresponding to the geometry data. (2) The parameter set may be encapsulated into the attribute component track corresponding to the attribute data. (3) The parameter information may be encapsulated as a type of point cloud data separately into the parameter component track. A sample in the parameter component track includes parameter information for a point cloud frame in the point cloud media.

The point cloud media exists in the track in the form of a component after being encapsulated. For example: The attribute data in the point cloud media exists in the form of an attribute component in the track after being encapsulated. The geometry data in the point cloud media exists in the form of a geometry component in the track after being encapsulated. The parameter set exists in the form of a parameter component in the track after being encapsulated.

V. Sample and Subsample

The sample is an encapsulation unit in a process of encapsulating a media file. A track is composed of many samples. For example: A video track may be composed of a plurality of samples. A sample is generally a video frame. In some embodiments, the media file of the point cloud media includes one or more tracks, and a sample in each track corresponds to one point cloud frame.

Each sample may be divided into one or more subsamples. Each subsample may include a type of point cloud data in the point cloud code stream. The point cloud data in the point cloud code stream may include the following types: a parameter set (including a geometry parameter set and an attribute parameter set), geometry data, and attribute data. Thus, each subsample may include the parameter set in the point cloud code stream, the geometry data in the point cloud code stream, or the attribute data in the point cloud code stream. In some embodiments, a point cloud frame may be divided into one or more point cloud slices (or referred to as point cloud strips). A point cloud slice represents a set of a series of syntactic elements (such as, geometry point cloud slices and attribute point cloud slices) of data obtained after a portion or an entirety of a point cloud frame is encoded. At this time, the attribute data and/or geometry data included in the subsample belongs to one or more point cloud slice. There are at least two types of subsamples of the corresponding point cloud slices. One type includes subsamples based on data types carried by the point cloud slices. In this type, a subsample only includes one data type carried by the point cloud slice and related information. For example, a subsample only includes a geometry data type and geometry data related information. Another type includes subsamples based on the point cloud slices. In this type, a subsample may include all information of a point cloud slice. To be specific, the subsample includes a geometry header and geometry data, as well as an attribute header and attribute data.

VI. Sample Entry

The sample entry is configured for indicating metadata information related to all samples in a track. For example, a sample entry of a video track may usually include metadata information related to decoder initialization.

VII. Point Cloud Space Tile:

The point cloud space tile is also referred to as a hexahedral space tile region in a boundary space region of a point cloud frame. A point cloud space tile is composed of one or more point cloud slices. The point cloud space tiles do not have an encoding and decoding dependency.

VIII. ISO Based Media File Format (ISOBMFF)

ISOBMFF is an encapsulation standard for a media file. A typical ISOBMFF file is an MP4 file.

IX. Dynamic Adaptive Streaming over HTTP (DASH) is an adaptive bit rate technology that enables a high-quality streaming media to be transferred over a traditional Hyper Text Transfer Protocol (HTTP) network server.

X. Media Presentation Description (MPD):

MPD is configured for describing media segment information in a media file.

XI. Representation:

Representation refers to a combination of one or more media components in DASH. For example, a video file with a resolution may be regarded as a Representation. In some embodiments, a video file at a time domain hierarchy may be regarded as a Representation.

XII. Point Cloud Compression (PCC)

Point cloud encoding refers to a process of encoding geometry data and attribute data of all points in a point cloud according to a parameter set to obtain a point cloud code stream. The point cloud encoding may include two main processes: encoding the geometry data and encoding the attribute data. The parameter set may include a geometry parameter set and an attribute parameter set. Therefore, in the encoding process, a point cloud encoding technology may be used to encode the geometry data of all the points in the point cloud media according to the geometry parameter set in the parameter set to obtain a geometry code stream. Furthermore, G-PCC is used to encode the attribute data of all the points in the point cloud media according to attribute parameter set in the parameter set to obtain an attribute code stream. The geometry code stream and the attribute code stream together constitute the point cloud code stream of point cloud media. At present, mainstream point cloud encoding technologies may include geometry structure-based point cloud encoding and projection-based point cloud encoding according to different types of point clouds. The geometry-based point cloud compression (G-PCC) in the MPEG and the AVS-PCC in the AVS are used.

XIII. Point Cloud Decoding

Point cloud decoding refers to a process of decoding a point cloud code stream obtained by encoding a point cloud to reconstruct the point cloud. In some embodiments, point cloud decoding refers to a process of reconstructing geometry information and attribute data of all points in a point cloud based on a geometry code stream and an attribute code stream in a point cloud code stream. After the point cloud code stream is obtained on the decoding side, for the geometry code stream, a geometry parameter set required by decoding of geometry data is first obtained, and then the geometry code stream is decoded based on the geometry parameter set to obtain the geometry data of all the points in the point cloud. For the attribute code stream, an attribute parameter set required by decoding of attribute data is first obtained, and then the attribute code stream is decoded based on the attribute parameter set to obtain the attribute data of all the points in the point cloud. Then, the reconstructed attribute data of all the points in the point cloud is matched with the reconstructed geometry data one to one in sequence to reconstruct the point cloud.

Based on the above description, some embodiments provide a data processing scheme based on point cloud media. The general principle of the data processing scheme based on the point cloud media is as follows: On an encoding side, attribute parameter set indication information may be added into a media file of point cloud media, and an encapsulation position of an attribute parameter set may be indicated through the attribute parameter set indication information. On a decoding side, the encapsulation position of the attribute parameter set required by decoding of the attribute data in a point cloud code stream may be determined according to the attribute parameter set indication information. Then, the attribute parameter set may be obtained from the encapsulation position, and the attribute data in the point cloud code stream may be decoded according to the attribute parameter set, thereby presenting the point cloud media.

In some embodiments, when the point cloud code stream is encapsulated into a single track, the track may include a sample. The sample includes a subsample. An attribute parameter set and a relationship between the attribute parameter set and the attribute data in the point cloud media may be identified in the subsample. In some embodiments, the attribute parameter set indication information in the media file is configured for indicating that the encapsulation position of the attribute parameter set is the subsample, and the attribute parameter set may be configured for indicating the relationship between the attribute parameter set and the attribute data in the point cloud code stream.

In some embodiments, when the point cloud code stream is encapsulated into a plurality of tracks, the attribute parameter set indication information is configured for indicating the encapsulation position of the attribute parameter set, which may include any or more of the following: (1) The attribute parameter set is encapsulated as a separate track to obtain a parameter component track. The attribute parameter set indication information is configured for indicating that the encapsulation position of the attribute parameter set is the parameter component track. (2) Since the attribute component track always depends on a geometry component track, even if an attribute parameter set is referenced by different attribute components, when the attribute parameter set is located on the geometry component track, no additional decoding dependency will be introduced. Under this premise, the attribute parameter set may be directly encapsulated on the geometry component track. At this time, the attribute parameter set indication information is configured for indicating that the encapsulation position of the attribute parameter set is the geometry component track. (3) A plurality of duplications of the attribute parameter set may be made, and the attribute parameter set is encapsulated in each attribute component track. At this time, the attribute parameter set indication information is configured for indicating that the attribute parameter set is encapsulated in each attribute component track. (4) An index of the attribute parameter set may be encapsulated in each attribute component track, and the attribute parameter set indication information is configured for indicating that the attribute parameter set is encapsulated in each attribute component track, and may further indicates that the index encapsulated in any attribute component track is configured for searching for the attribute parameter set, or configured for searching for a data unit formed by reorganizing the attribute parameter set.

The above data processing scheme has the following beneficial effects: The attribute parameter set indication information included in the media file of the point cloud media may indicate the encapsulation position of the attribute parameter set, thereby guiding the transmission, decoding, and presentation of the point cloud media. Meanwhile, the encoding and decoding independence between various components of the point cloud media can be effectively used to solve the problem of unnecessary encoding and decoding dependencies caused by encapsulating different point cloud data into different file tracks to support partial transmission and partial decoding. For example, geometry data is encapsulated into a geometry component track; color attribute data and reflectivity attribute data are each encapsulated into an attribute component track. At this time, if the color attribute data and the reflectivity attribute data share one attribute parameter set, regardless of which attribute component track this attribute parameter set is encapsulated in, the encoding and decoding dependency will be caused. Thus, transmission resources and computation resources are saved.

The data processing scheme based on the point cloud media provided in some embodiments may be combined with an Internet of Vehicle technology. In some embodiments, the data processing scheme based on the point cloud media can acquire buildings, traffic signs, etc. in an environment, and build a point cloud map in a vehicle for positioning, or use this point cloud map to achieve automatic navigation.

Figure 2A:
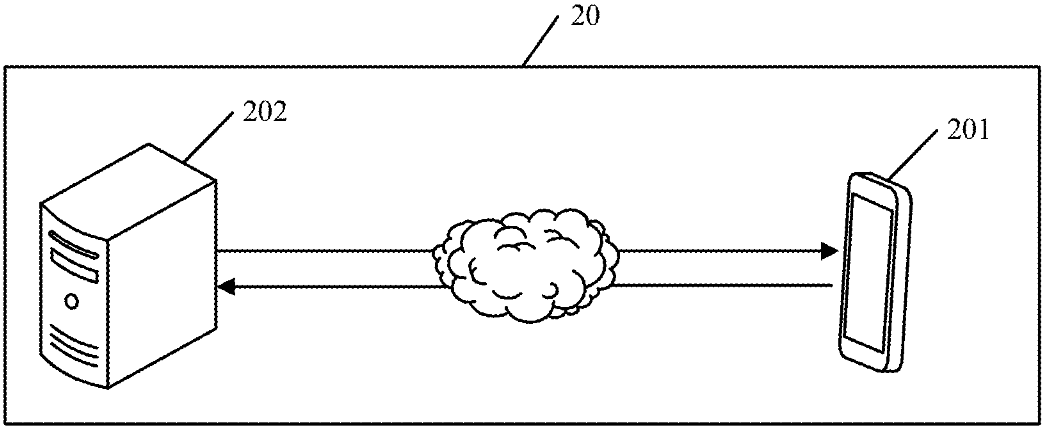
FIG. 2A is an architecture diagram of a data processing system for point cloud media according to some embodiments.

Based on the above descriptions, a data processing system for point cloud media provided by some embodiments will be introduced below in conjunction with FIG. 2A. As shown in FIG. 2A, the data processing system 20 for the point cloud media may include a content production device 201 and a media processing device 202. The content production device 201 is located on an encoding side of the point cloud media. The content production device 201 may be a terminal device or a server. The media processing device 202 is located on the decoding side of point cloud media. The media processing device 202 may be a terminal device or a server. The content production device 201 and the media processing device 202 may be in communicatively connected to each other. The terminal may be a smartphone, a tablet, a laptop, a desktop computer, a smart speaker, a smartwatch, a car terminal, a smart TV, and the like, but are not limited to this. The server may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, Content Delivery Networks (CDNs), big data, and artificial intelligence platforms.

In some embodiments, the content production device 201 and the media processing device 202 perform a specific process of data processing for the point cloud media as follows: For the content production device 201, the following data processing processes are mainly included: (1) a process of obtaining point cloud media; and (2) a process of encoding and file encapsulation for the point cloud media. For the media processing device 202, the following data processing processes are mainly included: (3) a process of file de-encapsulation and decoding for the point cloud media; and (4) a process of rendering the point cloud media.

In addition, a transmission process of the point cloud media is involved between the content production device 201 and the media processing device 202. The transmission process may be carried out based on various transmission protocols (or transmission signaling). The transmission protocols may include but are not limited to: a Dynamic Adaptive Streaming over HTTP (DASH) protocol, an HTTP Live Streaming (HLS) protocol, a Smart Media Transport Protocol (SMTP), a Transmission Control Protocol (TCP), and the like.

The data processing processes for the point cloud media will be described in detail below:

(1) the Process of Obtaining Point Cloud Media.

The content production device 201 may obtain point cloud media. The point cloud media may be obtained through scene capturing or device generation. Obtaining the point cloud media through the scene capturing refers to capturing a visual scene of a real world through a capturing device associated with the content production device 201 to obtain the point cloud media. The capturing device is configured to provide point cloud media obtaining service for the content production device 201, and the capturing device may include but is not limited to any one of the following: a camera device, a sensing device, and a scanning device. The camera device may include an ordinary camera, a stereo camera, a light field camera, and the like. The sensing device may include a laser device, a radar device, and the like. The scanning device may include three-dimensional laser scanning device, and the like. The capturing device associated with the content production device 201 may refer to a hardware component arranged in the content production device 201, such as the capturing device being a camera of a terminal and a sensor. Or, the capturing device associated with the content production device may refer to a hardware apparatus connected to the content production device 201, such as a camera connected to the content production device 201. Obtaining the point cloud media through the device generation refers to generating the point cloud media by the content production device 201 according to a virtual object (such as a virtual three-dimensional object and a virtual three-dimensional scene obtained through three-dimensional modeling).

(2) the Process of Encoding and File Encapsulation for the Point Cloud Media.

The content production device 201 may encode geometry data in the obtained point cloud media based on a geometry parameter set to obtain a geometry code stream. The content production device 201 may further encode attribute data in the obtained point cloud media based on an attribute parameter set to obtain an attribute code stream. The geometry code stream and the attribute code stream form a point cloud code stream of the point cloud media. In addition, the point cloud code stream may include the attribute parameter set and the geometry parameter set. After the point cloud code stream is obtained, the point cloud code stream may be encapsulated to obtain a media file of the point cloud media. Further, the media file may include attribute parameter set indication information, and the attribute parameter set indication information is configured for indicating an encapsulation position of the attribute parameter set.

When the point cloud code stream is encapsulated into a single track by using a single-track mode, the single track may include one or more samples, and each sample may include all data of a point cloud frame in the point cloud media, including the geometry data, the geometry parameter set, the attribute data, and the attribute parameter set. Each sample is divided into one or more subsamples. In some embodiments, the attribute parameter set may be encapsulated in each subsample. The attribute parameter set indication information may be configured for indicating that the attribute parameter set is encapsulated in the subsample. At this time, a subsample may include a parameter set in the point cloud code stream, or a subsample may include the attribute data in the point cloud code stream, or a subsample may include the geometry data in the point cloud code stream.

When the point cloud code stream is encapsulated by using a type-based multi-track mode to obtain a plurality of tracks, any track may include one or more samples, and each sample may include a type of data of a point cloud frame in the point cloud media. For example, a sample in track 1 (a geometry component track) may include geometry data in the corresponding point cloud frame, and a sample in track 2 (a color component track) may include a group of color attribute data in the corresponding point cloud frame. A sample in track 3 (a parameter component track) may include an attribute parameter set in the point cloud frame. At this time, the attribute parameter set indication information may be configured for indicating that the attribute parameter set is independently encapsulated in the parameter component track. In addition, when the point cloud code stream is encapsulated by using the type-based multi-track mode to obtain the plurality of tracks, the plurality of tracks include a geometry component track and one or more attribute component tracks. At this time, the attribute parameter set may be directly encapsulated into the geometry component track, and the attribute parameter set indication information may be configured for indicating that the attribute parameter set is encapsulated in the geometry component track.

After the media file is obtained, the content production device 201 may transmit the media file to the media processing device 202, so that the encapsulation position of the attribute parameter set may be obtained according to the attribute parameter set indication information in the media processing device 202, and the attribute data of the point cloud code stream may be decoded based on the attribute parameter set.

In some embodiments, when the point cloud media is transmitted by using a streaming transmission mode, and the attribute parameter set is independently encapsulated in the parameter component track, a transmission signaling may include stream indication information. The stream indication information is configured for indicating a data stream corresponding to the parameter component track, and the above media file is transmitted to the media processing device 202 through the transmission signaling.

(3) The Process of File De-Encapsulation and Decoding for the Point Cloud Media.

The media processing device 202 may obtain the media file and corresponding media presentation description information of the point cloud media through the content production device 201. The media file and the media presentation description information of the point cloud media are transmitted from the content production device 201 to the media processing device 202 through the transmission signaling (such as DASH and SMT). The process of file de-encapsulation of the media processing device 202 is contrary to the process of file encapsulation of the media processing device 202. The media processing device 202 de-encapsulates media file resources according to a file format requirement of the point cloud media to obtain the point cloud code stream. The decoding process of the media processing device 202 is contrary to the encoding process of the content production device 201. The media processing device 202 decodes the point cloud code stream to restore the point cloud media.

In the decoding process, the media processing device 202 may obtain the attribute parameter set indication information from the media file, determine the encapsulation position of the attribute parameter set according to the attribute parameter indication information, obtain the attribute parameter set from the encapsulation position, and then decode the attribute data in the media file according to the attribute parameter set, thus ultimately restoring the point cloud media.

In some embodiments, the attribute parameter indication information may be configured for indicating a relationship between the attribute parameter set and the attribute data in the point cloud code stream. This relationship may be that the attribute parameter set is only effective for a group of attribute data in the point cloud code stream, or may be that the attribute parameter set is only effective for a type of attribute data in the point cloud code stream, or may be that the attribute parameter set is effective for all the attribute data in the point cloud code stream. The effectiveness refers to an effective force, which means that the attribute data in the point cloud code stream may be decoded according to the effective attribute parameter set.

The point cloud code stream may include a plurality of groups of attribute data. For example: the plurality of groups of attribute data include: a group of yellow attribute data, a group of red attribute data, and a group of reflectivity attribute data. The attribute parameter set is only effective for a group of attribute data in the point cloud code stream, which may refer to being only effective for the group of yellow attribute data. The attribute parameter set is only effective for a type of attribute data in the point cloud code stream, which may refer to being effective for color attribute data. Both the yellow attribute data and the red attribute data belong to the color attribute data, so that the attribute parameter set is only effective for a type of attribute data in the point cloud code stream, which may refer to being effective for both the yellow attribute data and the red attribute data.

(4) the Process of Rendering the Point Cloud Media.

The media processing device 202 renders the decoded point cloud media according to metadata related to rendering and windows in the media presentation description information to obtain a point cloud frame of the point cloud media, and presents the point cloud media according to presentation time of the point cloud frames.

Figure 2B:
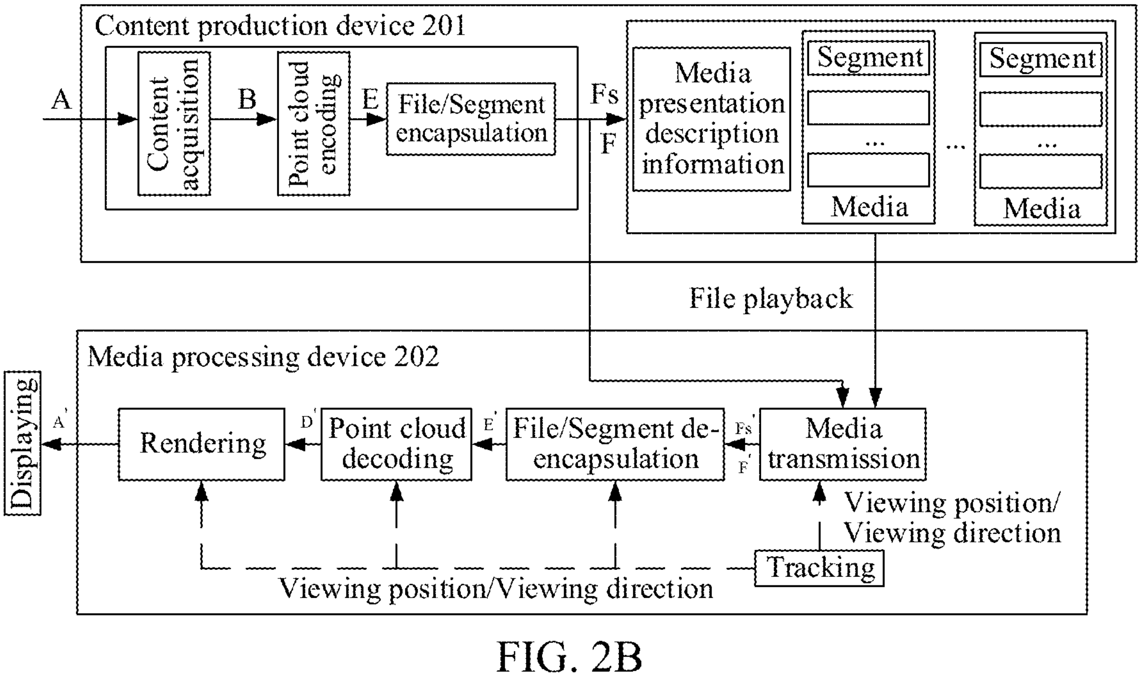
FIG. 2B is a flowchart of data processing for point cloud media according to some embodiments.

In some embodiments, referring to FIG. 2B, on the content production device end: Firstly, a visual scene A in a real world is sampled by using an acquisition device to obtain point cloud source data B of point cloud media corresponding to the visual scene in the real world, where the point cloud source data B is a frame sequence composed of a large number of point cloud frames. Then, the obtained point cloud media is encoded according to the parameter set (namely, the geometry parameter set and the attribute parameter set) to obtain a point cloud code stream E (including an encoded geometry code stream and an encoded attribute code stream). In some embodiments, the point cloud code stream E may include a parameter set. Next, the point cloud code stream E is encapsulated to obtain a media file corresponding to the point cloud media. In some embodiments, the content production device 201 combines one or more encoded code streams into a media file F for file playback according to a specific media container file format, or into a sequence (FS) of an initialization segment and a media segment for stream transmission. The media container file format may refer to an ISO basic media file format specified in the International Organization for Standardization (ISO)/International Electrotechnical Commission (IEC) 14496-12. The media file may further include parameter set indication information, and the parameter set indication information is configured for indicating an encapsulation position of a parameter set. In some embodiments, the content production device further encapsulates the metadata into the media file or the sequence of the initialization/media segment, and transmits the sequence of the initialization/media segment to the media processing device 202 through transmission signaling (such as a dynamic adaptive streaming media transmission interface).

On the media processing device end: Firstly, the media file transmitted by the content production device 201 is received. The media file may include: the media file F' for file playback, or the sequence $F_s$' of the initialization segment and the media segment for stream transmission; the media file is de-encapsulated to obtain the point cloud code stream E'; Then, the parameter set is obtained according to the encapsulation position indicated by the parameter set indication information included in the media file, and the point cloud code stream is decoded according to the parameter set (namely, the attribute data in the point cloud code stream is decoded according to the attribute parameter set in the parameter set and the geometry data in the point cloud code stream is decoded according to the geometry parameter set in the parameter set) to obtain the point cloud media D'. In some embodiments, the media processing device determines a media file or a media segment sequence required by presentation of point cloud media based on a viewing position/direction of a current object; and decodes the media file or media segment sequence required by the presentation of the point cloud media to obtain the point cloud media to be presented. Finally, the decoded point cloud media is rendered based on the viewing (window) direction of the current object to obtain the point cloud frame A' of the point cloud media, and the point cloud media is presented on a screen of a head-mounted display or any other display device carried by the media processing device according to the presentation time of the point cloud frame. The viewing position/direction of the current object is determined by a head following function and possibly a visual following function. In addition to using a renderer to render the point cloud media in the viewing position/direction of the current object, an audio decoder may be used to optimize the decoding of audios in the viewing (window) direction of the current object. In a window-based transmission process, the current viewing position and viewing direction are also transmitted to a policy module to determine a track to be received.

The data processing technology for the point cloud media in some embodiments may be implemented based on a cloud technology. For example, a cloud server is used as the content creation device. The cloud technology is a hosting technology for unifying a series of resources such as hardware, software networks in a wide area network or a local area network to achieve computation, storage, processing and sharing of data.

In some embodiments, a media file of point cloud media is obtained, the media file including a point cloud code stream of the point cloud media and an attribute parameter set. The attribute parameter set includes parameter information required by decoding of attribute data in the point cloud code stream; and the attribute parameter set indication information is configured for indicating an encapsulation position of the attribute parameter set. The encapsulation position of the attribute parameter set can be directly obtained according to the attribute parameter set indication information, and the point cloud code stream can be decoded based on the attribute parameter set to present the point cloud media. Transmission, decoding, and presentation of the point cloud media are guided; unnecessary encoding and decoding dependencies can be reduced; and transmission resources and computation resources can be saved.

Figure 3:
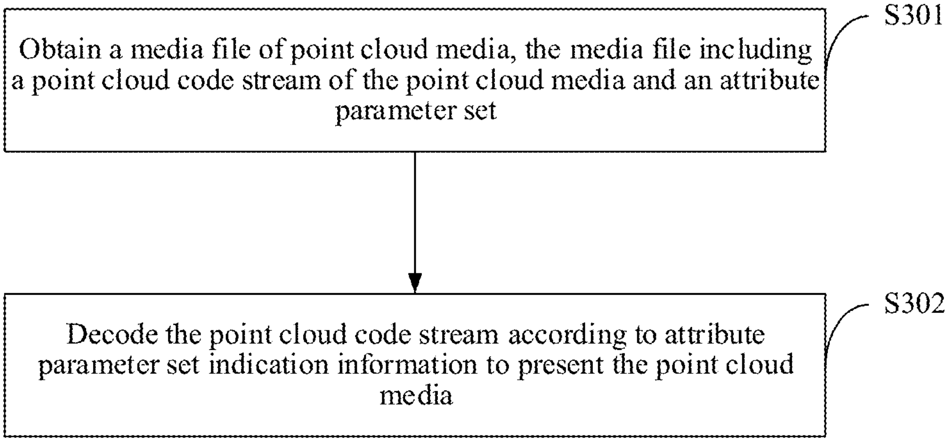
FIG. 3 is a flowchart of a data processing method for point cloud media according to some embodiments.

A related description will be made to a data processing method for point cloud media in some embodiments below. FIG. 3 is a flowchart of a data processing method for point cloud media according to some embodiments. The method may be performed by the above media processing device. The data processing method for the point cloud media described in this embodiment may include S301 to S302 below:

S301: Obtain a media file of point cloud media, the media file including a point cloud code stream of the point cloud media and an attribute parameter set, the attribute parameter set including parameter information required by decoding of attribute data in the point cloud code stream; and the media file further including attribute parameter set indication information, and the attribute parameter set indication information being configured for indicating an encapsulation position of the attribute parameter set.

In some embodiments, the attribute parameter set indication information may be configured for indicating a relationship between the attribute parameter set and the attribute data in the point cloud code stream. The attribute parameter set indication information may indicate the attribute parameter set and the attribute data corresponding to the attribute parameter set. For example, the attribute parameter set indication information indicates that the attribute parameter set is effective for a specific type of attribute data (such as color) in the point cloud code stream. In some embodiments, the attribute parameter set indication information indicates that the attribute parameter set is effective for a specific group of attribute data (such as a group of yellow attribute data) in the point cloud code stream. In some embodiments, the attribute parameter set indication information indicates that the attribute parameter set is effective for all attribute data in the point cloud code stream.

The media file is obtained by encapsulating the point cloud code stream of the point cloud media. In some embodiments, starting from a single-track mode and a multi-track mode, there are several implementations (1) to (2) for an encapsulation position of the attribute parameter set:

(1) When the single-track mode is used to encapsulate the point cloud code stream of the point cloud media into the same track, the attribute parameter set may be encapsulated in a subsample information box.

When the single-track mode is used to encapsulate the point cloud code stream of the point cloud media into the same track, the media file includes a track, and the track may include one or more samples. Each sample corresponds to a point cloud frame in the point cloud media. A sample may be divided into one or more subsamples. Each subsample may include any type of point cloud data in the point cloud code stream. For example, the subsample may include a parameter set, or the subsample may include attribute data or geometry data. The media file may further include a subsample information box, and the attribute parameter set may be encapsulated in the subsample information box. At this time, the attribute parameter set indication information is configured for indicating that the attribute parameter set is encapsulated in the subsample information box. The attribute parameter set indication information may be represented as the subsample information box, and the subsample information box may include at least one of the following fields: a payload type field, a reference attribute information flag field, a reference attribute type flag field, a reference attribute identifier field, and a reference attribute type field.

In some embodiments, the subsample information box may be used during the encapsulation of the point cloud code stream. When a point cloud frame may be divided into one or more point cloud slices, the attribute data and/or geometry data included in each subsample belongs to the one or more point cloud slices. The subsample information box may include a flag field of subsample information data. The subsample may be defined according to a value of the flag field of the subsample information data. The flag field specifies the type of the subsample in the subsample information box: If the flag field is a first preset value (such as 0), the subsample refers to a subsample based on a data type carried by the point cloud slice. In this case, a subsample only includes one data type and related data. For example, a subsample includes only a geometry data type and geometry data. If the flag field is a second preset value (such as 1), the subsample refers to a subsample based on the point cloud slice. In this case, a subsample includes only all related data of a point cloud slice, namely, including a geometry header and geometry data, as well as attribute header and attribute data. Of course, the flag field may reserve other flag values.

At this time, the field definition of codec_specific_parameters of the subsample information box can be found in Table 1:

TABLE 1

```
If (flags == 0){
unsined int(8) payloadType;
if(payloadType==0){
unsigned int(1) attribute_present_flag[0];
unsigned int(1) attribute_present_flag[1];
bit(21)   reserved = 0;
}
else if(payloadType=2){
unsigned int(1) ref_attr_info_flag;
if(ref_attr_info_flag == 1){
unsigned int(1) ref_attr_type_flag;
if(ref_attr_type == 0)
unsigned int(8) ref_attr_id;
else
unsigned int(8) ref_attr_type;
}
else
bit(9) reserved = 0;
bit(14) reserved = 0;
}
else
    bit(24)   reserved = 0;
}
else if (flags == 1){
  unsigned int(1) slice_data;
  if(slice_data){
    unsigned int(24)   slice_id;
    bit(7)   reserved = 0;
 }
  else
    bit(31)   reserved = 0;
}
```

All the fields included in the subsample information box are as follows:

Payload type field: The payload type field is configured for indicating a type of point cloud data included in each subsample; if the payload type field is a first value (such as 2), the type of the point cloud data included in each subsample is an attribute parameter set; if the payload type field is a second value (such as 3), the type of the point cloud data included in each subsample is a geometry parameter set; if the payload type field is a third value (such as 0), the type of the point cloud data included in each subsample is attribute data; and if the payload type field is a fourth value (such as 1), the type of the point cloud data included in each subsample is geometry data. The first value, the second value, the third value, and the fourth value may be arbitrarily set according to a need. For example, the first value may be 0, the second value may be 1, the third value may be 2, and the fourth value may be 3. The embodiments are not limited thereto.

Attribute presentation flag field (attribute_present_flag): The attribute presentation flag field may be configured for indicating whether each subsample includes color attribute data and/or reflectivity attribute data. The definition may be found in the AVS-PCC. If a value of the attribute presentation flag field is a first set value (such as 0), whether each subsample includes a color attribute is indicated; and if a value of the attribute presentation flag field is a second set value (such as 1), whether each subsample includes a reflectivity attribute is indicated.

Point cloud slice data field (slice_data): This field indicates whether each subsample includes data of a point cloud slice. If a value of the point cloud slice data field is a first set value (such as 1), each subsample includes point cloud slice geometry and/or attribute type data; and if a value of the point cloud slice data field is a second set value (such as 0), each subsample does not include parameter information of a point cloud.

Point cloud slice identifier field (slice_id): This field indicates an identifier of a point cloud slice corresponding to data included in each subsample.

Reference attribute information flag field (ref_attr_info_flag): The reference attribute information flag field is configured for indicating an effective range of a current attribute parameter set for attribute data; if the reference attribute information flag field is a first preset value (such as 1), the current attribute parameter set is only effective for a specific group (namely, a group) or a specific type (namely, a type) of attribute data in a current sample; and if the reference attribute information flag field is a second preset value (such as 0), the current attribute parameter set is effective for all attribute data in the current sample.

Reference attribute type flag field (ref_attr_type_flag): The reference attribute type flag field is configured for indicating a type of attribute data for which the current attribute parameter set is effective; if the reference attribute type flag field is a first numerical value (such as 1), the current attribute parameter set is only effective for one specific type of attribute data in the current sample; and if the reference attribute type flag field is a second numerical value (0), the current attribute parameter set is only effective for a specific group of attribute data in the current sample.

Reference attribute identifier field (ref_attr_id): The field is configured for indicating an identifier of the attribute data corresponding to the current attribute parameter set, namely, an identifier of the attribute data that the current attribute parameter set is effective for.

Reference attribute type field (ref_attr_type): The field is configured for indicating a type of the attribute data corresponding to the current attribute parameter set, namely, a type of the attribute data that the current attribute parameter set is effective for. For example, the reference attribute type field may be configured for indicating that the type of the attribute data corresponding to the current attribute parameter set is color. In some embodiments, the reference attribute type field may be configured for indicating that the type of the attribute data corresponding to the current attribute parameter set is reflectivity.

Reserved field: A value of the reserved field may be 0.

The current attribute parameter set refers to an attribute parameter set being used, and the current sample refers to a sample being decoded.

(2) When the multi-track mode is used to encapsulate the point cloud code stream of the point cloud media into a plurality of tracks, the encapsulation position of the attribute parameter set may include the following several situations a to d:

a. The attribute parameter set is independently encapsulated in a parameter component track.

When the point cloud code stream is encapsulated into the media file by the multi-track mode, some embodiments may define a parameter component track, and the point cloud code stream is encapsulated into the media file by a type-based multi-track mode. At this time, the media file may include the parameter component track, and the attribute parameter set is independently encapsulated in the parameter component track. A sample entry type of the parameter component track may be ‘apcp’ or ‘gpp1’; included in: sample description box; mandatory: No; Quantity: one or more.

At this time, the attribute parameter set indication information may be configured for indicating that the attribute parameter set is independently encapsulated in the parameter component track. The parameter component track includes one or more samples; each sample corresponds to a point cloud frame of the point cloud media; and each sample includes parameter information required by decoding of attribute data of the corresponding point cloud frame.

In some embodiments, the media file includes one or more parameter component tracks. In some embodiments, when the media file only includes one parameter component track, the attribute parameter set in the point cloud code stream is encapsulated into the parameter component track. In some embodiments, the geometry parameter set in the point cloud code stream may be encapsulated into the parameter component track. In some embodiments, the geometry parameter set and the attribute parameter set of the point cloud code stream may be both encapsulated into the parameter component track. In some embodiments, when the media file includes a plurality of parameter component tracks, the attribute parameter set in the point cloud code stream is encapsulated into a separate parameter component track, and the geometry parameter set in the point cloud code stream may be encapsulated into another separate parameter component track. In some embodiments, when the media file includes a plurality of parameter component tracks, the geometry parameter set in the point cloud code stream may be encapsulated into a separate parameter component track, and the attribute parameter set in the point cloud code stream may be encapsulated into a plurality of parameter component tracks based on types. For example, the attribute parameter set includes a color attribute parameter set and a reflectivity attribute parameter set. When the media file includes a plurality of parameter component tracks, the color attribute parameter set may be encapsulated into a separate parameter component track, and the reflectivity attribute parameter set may be encapsulated into another separate parameter component track.

In the multi-track mode, the attribute parameter set in the point cloud code stream is encapsulated as a parameter component track. The parameter component track may include a track box. The track box may include a track reference type box. A reference type of the track reference type box is ‘appr’. The track reference type box is configured for indicating that the parameter component track is associated with one or more attribute component tracks (namely, point cloud data tracks) corresponding to the attribute parameter set in the parameter component track. The track reference type box is configured for referring or associating one or more attribute component tracks corresponding to the attribute parameter set in the parameter component track. For example, if the attribute parameter set in the parameter component track includes a color parameter and a reflectivity parameter, the track reference type box is configured for referring or associating the color attribute component track and the reflectivity attribute component track corresponding to the attribute parameter set in the parameter component track.

In some embodiments, when the media file conforms to a first encoding standard (such as AVS), the parameter component track includes a component information box (AVSPCCComponentInfoBox); the component information box is arranged in a header sample entry (AvsPccParaHeaderSampleEntry) of the parameter component track. The component information box includes at least one of the following fields: a component type field, a header type field, an attribute header quantity field, a reference attribute type flag field, a reference attribute identifier field, and a reference attribute type field. The syntax of the component information box may be found in Table 2:

TABLE 2

```
aligned(8) class AvsPccParaHeaderSampleEntry( ) extends
  Volumetric VisualSampleEntry (apcp) {
    AVSPCCComponentInfoBox    info;
        }
    aligned(8) class AVSPCCComponentInfoBox
      extends FullBox('acif', version = 0, 0) {
        unsigned int(8) avs_pcc_type;
          if(avs_pcc_type == 4) {
            bit(4) reserved = 0;
           unsigned int(4) attr_type;
            }
          if(avs_pcc_type == 5){
          unsigned int(8) header_type;
    if(header_type == 0|| header_type == 2){
      unsigned int(8) attr_header_num;
      for(i=0;i< attr_header_num;i++){
      unsigned int(1) ref_attr_type_flag;
          if(ref_attr_type == 0)
        unsigned int(8) ref_attr_id;
              else
        unsigned int(8) ref_attr_type;
              bit(7) reserved;
              }
          }
        }
              }
```

All the fields included in the component information box are as follows:

Component type field (avs_pcc_type): The component type field is configured for indicating a type of a component in the track. When the component type field is set to a target preset value (such as 5), the type of the component in the parameter component track indicates a parameter set. A correspondence relationship between the value of the component type field and the type of the component may be as shown in Table 3:

TABLE 3

| Value of avs_pcc_type | Description |
|---|---|
| 1 | Reserved |
| 2 | Geometry data |
| 3 | Reserved |
| 4 | Attribute data |
| 5 | Parameter set |
| 6 . . . 31 | Reserved |

Attribute type field (attr_type): The attribute type field is configured for indicating a type of an attribute component included in the track. If the attribute type field is a first value (such as 0), the track only includes color attribute data. If the attribute type field is a second value (such as 1), the track only includes reflectivity attribute data. If the attribute type field is a third value (such as 2), the track includes both color attribute data and reflectivity attribute data.

Header type field (header_type): The header type field is configured for indicating a type of a parameter set included in the parameter component track. If the header type field is a first set value (such as 0), the type of the parameter set included in the parameter component track indicates an attribute parameter set. If the header type field is a second set value (such as 1), the type of the parameter set included in the parameter component track indicates a geometry parameter set. If the header type field is a third set value (such as 2), the type of the parameter set included in the parameter component track indicates both a geometry parameter set and an attribute parameter set. When the attribute parameter set in the point cloud code stream is encapsulated into a plurality of parameter component tracks, for example, when the geometry parameter set is encapsulated into a separate parameter component track, and the attribute parameter set is encapsulated into a separate parameter component track, the value of the header type field can only be the first set value and the second set value.

Attribute header quantity field (attr_header_num): The field is configured for indicating a quantity of attribute parameter sets included in each sample in the parameter component track. For example, the quantity of the attribute parameter sets may be 1, 2, or the like. An order of the attribute parameter sets included in the sample is consistent with an order of identifiers of the attribute parameter sets or types of the attribute parameter sets indicated in the component information box. For example, if the order of the attribute parameter sets included in the sample is attribute parameter set 1 and attribute parameter set 2, the order of the identifiers of the attribute parameter sets indicated in the component information data is also be the identifier of attribute parameter set 1 and the identifier of attribute parameter set 2.

Reference attribute type field (ref_attr_type_flag): The reference attribute type field is configured for indicating a type of attribute data for which a current attribute parameter set is effective. If the reference attribute type flag field is a first preset value (such as 0), the current attribute parameter set is only effective for one specific type of attribute data in a current sample. If the reference attribute type flag field is a second preset value (such as 1), the current attribute parameter set is effective for a specific group of attribute data in the current sample.

Reference attribute identifier field (ref_attr_id): The reference attribute identifier field is configured for indicating an identifier of attribute data corresponding to the current attribute parameter set.

Reference attribute type (ref_attr_type): The reference attribute type is configured for indicating a type of the attribute data corresponding to the current attribute parameter set.

The current attribute parameter set refers to an attribute parameter set being used, and the current sample refers to a sample being decoded.

In some embodiments, the media file may conform to a second encoding standard (such as the MPEG encoding standard). The parameter component track includes a component information box (GPCCComponentInfoBox) and a configuration box (GPCCConfigurationBox). The syntax of the configuration box may be found in Table 4:

TABLE 4

```
aligned(8) class GPCCSampleEntry( )
extends VolumetricVisualSampleEntry (type) {
GPCCConfigurationBox config;
GPCCComponentInfoBox info;
}
class GPCCConfigurationBox extends FullBox('gpcC', version = 0, 0) {
GPCCDecoderConfigurationRecord( ) GPCCConfig;
}
aligned(8) class GPCCDecoderConfigurationRecord {
unsigned int(8) configuration Version = 1;
unsigned int(8) profile_idc;
unsigned int(24) profile_compatibility_flags;
unsigned int(8) num_of_setup_unit_arrays;
for(i=0; i<num_of_setup_unit_arrays; i++) {
unsigned int(8) setup_unit_type;
unsigned int(1) array_completeness;
unsigned int(7) num_of_setup_units;
```

TABLE 4-continued

```
for (j=0; j<num_of_setup_units; j++) {
tlv_encapsulation setupUnit;
    }
  }
}
```

All the fields included in the configuration box are as follows:

Configuration version field: The configuration version field is configured for configuring and recording version information. If version information of the configuration version field in a corresponding track cannot be identified by a player/decoder, the player/decoder may not attempt to decode the corresponding track.

Profile field (profile_idc): The profile field is configured for indicating profile information of a code stream corresponding to a current track.

Profile compatibility field (profile_compatibility_flag): The profile compatibility field is configured for indicating profile compatibility information of the code stream corresponding to the current track.

Quantity of setup unit field (num_of_setup_unit_arrays): The quantity of setup unit field is configured for indicating a quantity of parameter set groups included in a current decoder configuration record, and each parameter set group corresponds to a type of parameter set.

Setup unit type field (setup_unit_type): The setup unit type field is configured for indicating a type of a parameter set corresponding to a current parameter set group.

Parameter set indication field (array_completeness): The parameter set indication field is configured for indicating an indication state of the current type of parameter set included in the corresponding point cloud code stream in the decoder configuration record. When the parameter set indication field is a first value (such as 1), parameter sets of the current type included in the corresponding code stream are all indicated in the configuration record of the decoder. When the parameter set indication field is a first value (such as 0), the parameter sets of the current type included in the corresponding code stream are partially indicated in the decoder configuration record and partially indicated in the code stream.

Setup unit quantity field (num_of_setup_units): The setup unit quantity field is configured for indicating a quantity of parameter sets of the current type. The setup unit includes a data unit of a sequence parameter set (SPS), a geometry parameter set (GPS), an attribute parameter set (APS), or point cloud tile information.

In some embodiments, a parameter set type corresponding to a setup unit included in the configuration box is the same as a parameter set type indicated by the component information box. The setup unit may include a data unit of a sequence parameter set (SPS), a geometry parameter set (GPS), an attribute parameter set (APS), or point cloud tile information. When the parameter set type corresponding to the setup unit indicates an attribute parameter set, the parameter set type indicated by the component information box also indicates an attribute parameter set. When the parameter set type corresponding to the setup unit included in the configuration box indicates a geometry parameter set, the parameter set type indicated by the component information box also indicates a geometry parameter set.

The component information box includes at least one of the following fields: a component type field, a parameter setting type quantity field, and a parameter setting type field. The syntax of the component information box may be found in Table 5:

TABLE 5

```
aligned(8) class GPCCComponentInfoBox
   extends FullBox('ginf', version = 0, 0) {
   unsigned int(8) gpcc_type;
   if(gpcc_type == 4) {
        unsigned int(8) attr_index;
        Unsigned int(1) attr_type_present_flag;
   bit(4) reserved = 0;
if (attr_type_present_flag)
{
   unsigned int(3) attr_type;
   }else{
   bit(3) reserved = 0;
   }
   utf8string attr_name;
      }
if(gpcc_type == 5){
unsigned int(8) num_para_set_type;
for(i=0; i<num_para_set_type; i++){
   unsigned int(8) parameter_set_type;
      }
   }
}
```

All the fields included in the component information box are as follows:

Component type field (gpcc_type): The field is configured for indicating a type of a component in the track. If the component type field is a target set value (such as 5), the type of the component in the parameter component track indicates a parameter set. A correspondence relationship between the value of the component type field and the type of the component may be found in Table 6:

TABLE 6

| Value of gpcc_type | Description |
|---|---|
| 1 | Reserved |
| 2 | Geometry data |
| 3 | Reserved |
| 4 | Attribute data |
| 5 | Parameter set |
| 6 . . . 31 | Reserved |

Parameter setting type quantity field (num_para_set_type): The field is configured for indicating a quantity of parameter sets included in the parameter component track. For example, the quantity of the parameter sets included in the parameter component track may be 1, 2, or the like. In some embodiments, when the media file includes a plurality of parameter component tracks, for example, when a geometry parameter set is separately encapsulated into one parameter component track, and an attribute parameter set is separately encapsulated into another parameter component track, each parameter component track only includes one type of parameter set, so the parameter setting type quantity field may not be required.

Parameter setting type field (parameter_set_type): The parameter setting type field is configured for indicating the type of parameter set included in the parameter component track. If the parameter setting type field is a first preset value (such as 0), the type of the parameter sets included in the parameter component track indicates attribute parameter sets. If the parameter setting type field is a second preset value (such as 1), the type of the parameter sets included in the parameter component track indicate geometry parameter sets. If the parameter setting type field is a third preset value (such as 2), the type of the parameter sets included in the parameter component track indicate sequence parameter sets.

Attribute index field (attr_index): The attribute index field is configured for indicating serial numbers of attribute parameters indicated in the SPS (namely, the sequence parameter set).

Attribute type presentation field (attr_type_present_flag): The attribute type presentation field is configured for indicating whether attribute data type information is indicated in the component information box. If the attribute type presentation field is a first value (such as 1), the attribute data type information is indicated in the component information box. If the attribute type presentation field is a second value (such as 0), the component information box indicates the attribute data type information. A relationship between four bytes and attribute data types is found Table 7:

TABLE 7

| Attribute_label_four_bytes | |
|---|---|
| Attribute_label_four_bytes [i] | Attribute type |
| 0 | Colour |
| 1 | Reflectancestry |
| 2 | Frame index |
| 3 | Material ID |
| 4 | Transparency |
| 5 | Normals |
| 6 . . . 255 | Reserved |
| 256 . . . 0xffffffff | Unspecified |

Attribute type field (attr_type): The attribute type field is configured for indicating a type of an attribute component, and its value refers to the definition in the ISO/IEC 23090-9 [GPCC] standard.

Attribute name field (attr_name): The attribute name field is configured for indicating human-readable attribute component type information.

b. The attribute parameter set is encapsulated into a geometry parameter component track.

When the point cloud code stream is encapsulated into a plurality of tracks by using a multi-track mode, in addition to encapsulating the attribute parameter sets into the independent parameter component tracks, all the attribute parameter sets may be encapsulated into the geometry component tracks included in the media file. Since the attribute component track always depends on the geometry component track, even if an attribute parameter set is referenced by different attribute components, when the attribute parameter set is located in the geometry component track, no additional decoding dependency will be introduced.

In the multi-track mode, the above media file may include one geometry component track and at least one attribute component track. A track reference tool defined by the ISO/IEC 14496-12 [ISOBMFF] needs to be used to perform association indexing between the geometry component track and the attribute component track in the AVS PCC.

The geometry component track may include one or more samples. In a sample entry of the geometry component track, there is a decoder configuration box. The decoder configuration box includes an SPS, a GPS, an APS, and other parameter sets, and the attribute component track may not include the decoder configuration box.

When the point cloud code stream includes an attribute parameter set, the attribute parameter set may be included in the corresponding sample of the geometry component track. The attribute component track may not include any type of attribute parameter set, only include attribute data of a corresponding type. Based on this, the relevant field of the component information box is modified, and the modified field is as follows: Component type field (gpcc_type): The component type field is configured for indicating the type of the component in the track. A value of the component type field is found in Table 8:

TABLE 8

| Value of gpcc_type | Description |
|---|---|
| 1 | Reserved |
| 2 | Geometry data and parameter set |
| 3 | Reserved |
| 4 | Attribute data (no parameter set) |
| 5 . . . 31 | Reserved |

When the media file includes a geometry component tracks and an attribute component track, the attribute parameter set is encapsulated in the geometry component track. The geometry component track may include a component information box. The component information box includes a component type field. The component type field is configured for indicating the type of the component in the geometry component track. If the component type field is a first set value (such as 2), the type of the component in the geometry component track is geometry data and a parameter set. The parameter set may include the attribute parameter set and the geometry parameter set. In the attribute component track, the component type field included in the component information box is a second set value (such as 4), the type of the component in the attribute component track is attribute data, and no parameter set is included.

c. The attribute parameter set may be encapsulated into each attribute component track.

The media file may include one or more attribute component track. The attribute parameter set may be copied into each attribute component track, so that each attribute component track includes the corresponding attribute parameter set. At this point, the attribute parameter set is encapsulated in each attribute component track. The attribute parameter set indication information may be configured for indicating that the attribute parameter set is encapsulated in each attribute track. The attribute parameter sets encapsulated in the various attribute component tracks are obtained by copying the same attribute parameter set. To be specific, when the quantity of the attribute component tracks is N, the attribute parameter set may be directly copied for N times, and one attribute parameter set may be placed in each attribute component track.

d. The index of the attribute parameter set may be encapsulated into each attribute component track.

The attribute parameter set includes an index. The attribute parameter set may be repeatedly indexed in each attribute component track. Namely, the index of the attribute parameter set is set in the various attribute component tracks. The attribute parameter set indication information is configured for indicating that the index of the attribute parameter set is encapsulated in the various attribute component tracks. The attribute parameter set may be found through the index encapsulated in any attribute component track, or a data unit formed by reorganizing the attribute parameter set may be found through the index encapsulated in any attribute component track.

Figure 4A:
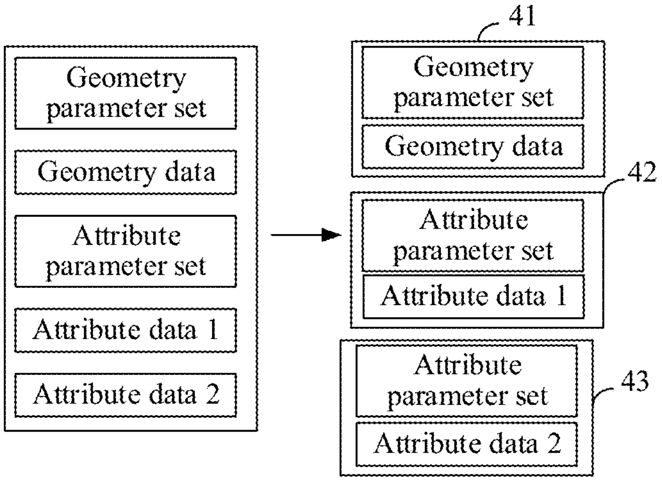
FIG. 4A is a schematic diagram of classifying a parameter set and attribute data into a data unit according to some embodiments.
Figure 4B:
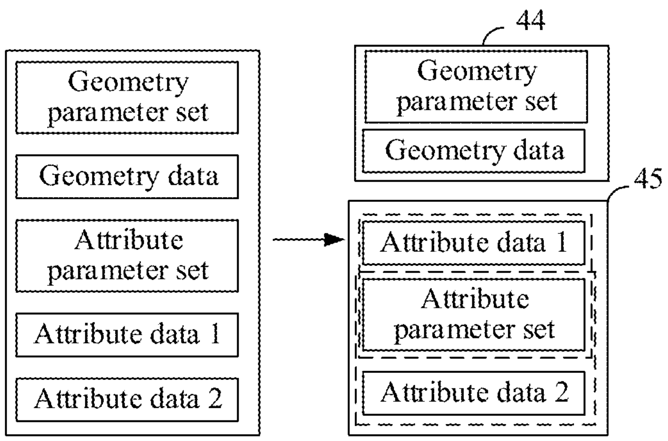
FIG. 4B is a schematic diagram of classifying a parameter set and attribute data into a data unit according to some embodiments.

In some embodiments, after the point cloud code stream may be reorganized, the samples of different types of attribute component tracks and the corresponding attribute parameter sets may be indexed to the same data unit. As shown in FIG. 4A, the point cloud code stream includes a geometry parameter set (GPS), geometry data (Geometry), an attribute parameter set (APS), attribute data 1 (Attribute1), and attribute data 2 (Attribute2). After the point cloud code stream is reorganized, the geometry parameter set and the samples in the geometry component track to which the geometry data belongs may be indexed to the same data unit 41. The attribute parameter set and the samples in the attribute component track to which attribute data 1 belongs may be indexed to the same data unit 42. The attribute parameter set and the samples in the attribute component track to which attribute data 2 belongs may be indexed to the same data unit 43. In some embodiments, as shown in FIG. 4B, after the point cloud code stream is reorganized, the geometry parameter set and the samples in the geometry component track to which the geometry data belongs may be indexed to the same data unit 44, and the attribute parameter set, the samples in the attribute component track to which attribute data 1 belongs, and the samples in the attribute component track to which attribute data 2 belongs may be indexed to the same data unit 45. In the data unit 45, the index encapsulated in the attribute component track to which attribute data 1 belongs and the index encapsulated in the attribute component track to which attribute data 2 belongs may both be indexed to the data unit 45.

In some embodiments, when the point cloud media is transmitted by using a streaming transmission mode. Obtain a media file of point cloud media, which may include: Obtain a transmission signaling of the point cloud media, and then obtain the media file of the point cloud media according to the transmission signal. Since the media file is transmitted through the transmission signaling by the streaming transmission mode, when the attribute data needs to be decoded, it is necessary to request a data stream corresponding to the parameter component track to obtain a corresponding attribute parameter set and achieve transmission guidance for the media file corresponding to the point cloud media. In the streaming transmission mode, if the attribute parameter set is independently encapsulated in the parameter component track, the transmission signaling further includes stream indication information. The stream indication information is configured for indicating the data stream corresponding to the parameter component track.

The data stream may be a Representation. The transmission signaling may be a DASH signaling, and the stream indication information may refer to a component descriptor (GPCCComponent descriptor). The component descriptor is set to the data stream corresponding to the parameter component track. The component descriptor includes a component type element and a parameter type element; and the component type element is configured for indicating the type of the component in the parameter component track. If the component type element (component@component_type) is a target character (such as 'prms'), the type of the component in the parameter component track indicates a parameter component. The parameter type element is configured for indicating the type of the parameter set included in the parameter component track. Attributes and elements of the component descriptor may be found in Table 9:

TABLE 9

| Elements and attributes in GPCCComponent descriptor | Use | Type | Description |
|---|---|---|---|
| Component | 0 . . . N | gpcc:gpccComponentType | The attribute of the element specifies information for a geometry component (also referred to as a geometry point cloud component) that appears in the Representation of an adaptive set. |
| component@component_type (component type element) | M | xs:string | The element indicates the type of the component. 'geom' represents a geometry component; 'attr' represents an attribute component; and 'prms' represents a parameter set component. |
| component@attribute_type (attribute type element) | CM | xs:unsignedByte | The attribute type element is configured for indicating a type of an attribute (specifically refer to ISO/IEC 23090-9) A value of the attribute type element is only allowed within a range of 0 to 255 (including 255). It only appears when the component is a GPCC attribute component. At this time, the attribute type element is 'attr.' |
| component@attr_index (attribute index element) | CM | xs:unsignedByte | The attribute index element is configured for indicating an order of an attribute in the SPS. A value of the attribute index |

TABLE 9-continued

| Elements and attributes in GPCCComponent descriptor | Use | Type | Description |
|---|---|---|---|
| | | | element (@attr_index) may be the same as an SPS attribute index value in the G-PCC setup unit carried in the Representation in the adaptive set. It only appears when the component is a point cloud attribute component. At this time, the attribute type element is 'attr'. In this case, the value of the attribute type element (@component_type) is 'attr' |
| component@tile_ids (space tile element) | CM | xs:UIntVectorType | The space tile element is configured for indicating a space separator identifier list corresponding to a value of an identification element of each G-PCC space tile existing in a G-PCC space tile track. The space tile element only appears in a space tile adaptive set. It only appears when a corresponding space tile track carries a fixed quantity of space tiles and the space tile identifier |
| | CM | xs:UIntVectorType | does not change in the entire code stream. A dynamic space tile element may be set to 0 in a space tile sample entry (GPCCTileSampleEntry) of each space tile track. |
| component@para_type (parameter type element) | | | When a value of component_type is 'prms', the parameter type element is a required element. The parameter type element is a list of N parameter set types. For the first encoding standard (such as AVS), if the value of the parameter type element is a first value (such as 0), it represents an attribute parameter set (namely, an attribute header). If the value of the parameter type element is a second value (such as 1), it represents a geometry parameter set (a geometry header). For the MPEG standard, if the value of the parameter type element is a first value (such as 0), it represents an attribute parameter set (namely, APS). If the value of the parameter type element is a second value (such as 1), it represents a geometry parameter set (GPS). If the value of the parameter type element is a third value (such as 2), it represents a sequence parameter set (SPS). |

Where M: Mandatory; CM: Conditional Mandatory; O: Optional.

S302: Decode the point cloud code stream according to the attribute parameter set indication information to present the point cloud media.

In some embodiments, decode the point cloud code stream according to the attribute parameter set indication information to present the point cloud media, which may include: Obtain the attribute parameter set according to an encapsulation position indicated by the attribute parameter set indication information; and decode the attribute data in the point cloud code stream by using the attribute parameter set to present the point cloud media. In some embodiments, the encapsulation position indicated by the attribute parameter set indication information may be first decoded to obtain the attribute parameter set. For example, if the encapsulation position indicated by the attribute parameter set indication information is a parameter component track, the parameter component track needs to be decoded, thus obtaining the attribute parameter set. Attribute data to be decoded is determined according to a need, and the attribute parameter set is used to decode the attribute data. In this way, the related point cloud media can be partially decoded, which saves decoding resources.

In some embodiments, a media file of point cloud media is obtained, the media file including a point cloud code stream of the point cloud media and an attribute parameter set. The attribute parameter set includes parameter information required by decoding of attribute data in the point cloud code stream; and the attribute parameter set indication information is configured for indicating an encapsulation position of the attribute parameter set. The encapsulation position of the attribute parameter set can be directly obtained according to the attribute parameter set indication information, and the point cloud code stream can be decoded based on the attribute parameter set to present the point cloud media. Transmission, decoding, and presentation of the point cloud media are guided; unnecessary encoding and decoding dependencies can be reduced; and transmission resources and computation resources can be saved.

Figure 5:
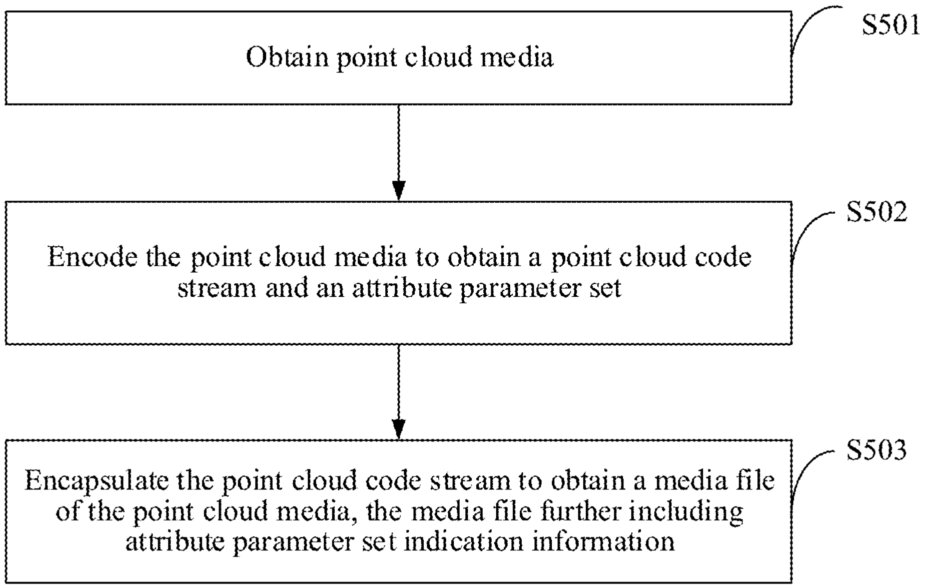
FIG. 5 is a flowchart of a data processing method for point cloud media according to some embodiments.

FIG. 5 is a flowchart of a data processing method for point cloud media according to some embodiments. The data processing method for the point cloud media may be performed by a content production device. The data processing method for the point cloud media may include S501 to S503 as follows:

S501: Obtain point cloud media.

S502: Encode the point cloud media to obtain a point cloud code stream and an attribute parameter set, the attribute parameter set including parameter information required by decoding of attribute data in the point cloud code stream.

Some embodiments for encoding the point cloud media may be found in the description of the foregoing corresponding part, and will not be elaborated here.

S503: Encapsulate the point cloud code stream to obtain a media file of the point cloud media. The media file further includes attribute parameter set indication information.

The attribute parameter indication information may be added into the media file, and the attribute parameter set indication information may be configured for indicating an encapsulation position of the attribute parameter set. In addition, the attribute parameter set indication information may be configured for indicating a relationship between the attribute parameter set and the attribute data in the point cloud code stream. For example, the attribute parameter set is effective for a type or group of attribute data in the point cloud code stream.

Encapsulating the point cloud code stream to obtain the media file of the point cloud media may include the following implementations:

(1) The media file includes a track, and the point cloud code stream is encapsulated in the track. The track includes one or more samples, and each sample corresponds to a point cloud frame in the point cloud media. A sample is divided into one or more subsamples. Each subsample includes a type of point cloud data. The media file further includes a subsample information box; and the attribute parameter set is encapsulated in the subsample information box.

In some embodiments, the content production device may use a single-track mode to encapsulate the point cloud code stream into a track. The track includes one or more samples, and a sample corresponds to one point cloud frame in the point cloud media. Each sample is divided into one or more subsamples. When the single-track mode is used to encapsulate the point cloud code stream of the point cloud media into the same track, during the encapsulation of the point cloud code stream, a subsample information box may be used. The attribute parameter set in the point cloud code stream may be set in the subsample information box to form the media file of the point cloud media. The attribute parameter set indication information is configured for indicating that the attribute parameter set is set in the subsample information box.

The subsample information box may include a flag field of subsample information data. When a point cloud frame may be divided into one or more point cloud slices, the attribute data and/or geometry data included in each subsample belongs to the one or more point cloud slices. The subsample is defined according to a value of the flag field of the subsample information data. The flag field specifies the type of the subsample in the subsample information box: If the flag field is a first preset value (such as 0), the subsample refers to a subsample based on a data type carried by the point cloud slice. In this case, a subsample only includes one data type and related data. For example, a subsample includes only a geometry data type and geometry data. If the flag field is a second preset value (such as 1), the subsample refers to a subsample based on the point cloud slice. In this case, a subsample includes only all related data of a point cloud slice, namely, including a geometry header and geometry data, as well as attribute header and attribute data.

The subsample information box may include one or more of the following fields: a payload type field, a reference attribute information flag field, a reference attribute type flag field, a reference attribute identifier field, and a reference attribute type field. The payload type field is configured for indicating a type of point cloud data included in each subsample. The reference attribute information flag field is configured for indicating an effective range of a current attribute parameter set for attribute data. The reference attribute type flag field is configured for indicating a type of attribute data for which the current attribute parameter set is effective. The reference attribute identifier field is configured for indicating an identifier of attribute data corresponding to the current attribute parameter set. The reference attribute type field is configured for indicating a type of the attribute data corresponding to the current attribute parameter set.

At this time, the attribute parameter set in the point cloud code stream is set in the subsample information box, which may include: If the type of the point cloud data included in the subsample indicates an attribute parameter set, the payload field is set to a first value (such as 2). If the type of the point cloud data included in the subsample indicates a geometry parameter set, the payload field is set to a second value (such as 3). If the current attribute parameter set is only effective for a specific group (namely, a group) or a specific type (namely, a type) of attribute data in a current sample, the reference attribute information flag field is set to a first preset value (such as 1). If the current attribute parameter set is effective for all attribute data in the current sample, the reference attribute information flag field is set to a second preset value (such as 0). If the current attribute parameter set is only effective for a specific type of attribute data in the current sample, the reference attribute type flag field is set to a first numerical value (such as 1). If the current attribute parameter set is only effective for a specific group of attribute data in the current sample, the reference attribute type flag field is set to a second numerical value (such as 0). The current attribute parameter set refers to an attribute parameter set being used, and the current sample refers to a sample being encoded.

(2) The point cloud code stream is encapsulated into the media file in a multi-track mode. The media file includes a parameter component track; and the attribute parameter set is independently encapsulated in the parameter component track. The parameter component track includes one or more samples; each sample corresponds to a point cloud frame of the point cloud media; and each sample includes parameter information required by decoding of attribute data of the corresponding point cloud frame. The attribute parameter set indication information is configured for indicating that the attribute parameter set is independently encapsulated in the parameter component track.

The media file includes one or more parameter component tracks. In some embodiments, when the media file only includes one parameter component track, the attribute parameter set in the point cloud code stream is encapsulated into the parameter component track. In some embodiments, the geometry parameter set in the point cloud code stream may be encapsulated into the parameter component track. To be specific, the geometry parameter set and the attribute parameter set of the point cloud code stream may be both encapsulated into the parameter component track. In some embodiments, when the media file includes a plurality of parameter component tracks, the geometry parameter set in the point cloud code stream is encapsulated into a separate parameter component track, and the attribute parameter set in the point cloud code stream may be encapsulated into a separate parameter component track. In some embodiments, when the media file includes a plurality of parameter component tracks, the geometry parameter set in the point cloud code stream is encapsulated into a separate parameter component track, and the attribute parameter set in the point cloud code stream may be encapsulated into the plurality of parameter component tracks based on types.

In some embodiments, the attribute parameter set in the point cloud code stream may be encapsulated into the parameter component tracks based on the types. Geometry data in the point cloud code stream may be encapsulated into a geometry component track. Attribute data in the point cloud code stream may be encapsulated into an attribute component track, thus ultimately forming the media file of the point cloud media. This media file may include the parameter component tracks, the attribute component track, and the geometry component track. The parameter component track includes one or more samples; each sample corresponds to a point cloud frame of the point cloud media; and each sample includes parameter information required by decoding of attribute data of the corresponding point cloud frame. The attribute component track may include one or more samples. Each sample corresponds to one point cloud frame of the point cloud media. Each sample includes attribute data of the corresponding point cloud frame. The geometry component track may include one or more samples. Each sample corresponds to one point cloud frame of the point cloud media. Each sample includes geometry data of the corresponding point cloud frame. The parameter component track includes a track box. The track box includes a track reference type box; and the track reference type box is configured for indicating that the parameter component track is associated with one or more attribute component tracks corresponding to the attribute parameter set in the parameter component track.

a. When the media file conforms to a first encoding standard (such as AVS), the parameter component track includes a component information box, and the component information box includes at least one of the following fields: a component type field, a header type field, an attribute header quantity field, a reference attribute type flag field, a reference attribute identifier field, and a reference attribute type field. The component type field is configured for indicating a type of a component in the parameter component track. The header type field is configured for indicating a type of a parameter set included in the parameter component track. The attribute header quantity field is configured for indicating a quantity of attribute parameter sets included in each sample in the parameter component track. An order of the attribute parameter sets included in the sample is consistent with an order of identifiers of the attribute parameter sets or types of the attribute parameter sets indicated in the component information box. The reference attribute type field is configured for indicating a type of attribute data for which a current attribute parameter set is effective. The reference attribute identifier field is configured for indicating an identifier of attribute data corresponding to the current attribute parameter set. The reference attribute type is configured for indicating a type of the attribute data corresponding to the current attribute parameter set. The current attribute parameter set refers to an attribute parameter set being used, and the current sample refers to a sample being encoded.

At this point, encapsulating the attribute parameter set in the point cloud code stream into the parameter component track through multiple tracks may include: If the type of the component in the parameter component track indicates a parameter set, the component type field is set to a target preset value. If the type of the parameter set included in the parameter component track indicates an attribute parameter set, the header type field is set to a first set value. If the type of the parameter set included in the parameter component track indicates a geometry parameter set, the header type field is set to a second set value. If the type of the parameter set included in the parameter component track indicates a geometry parameter set and an attribute parameter set, the header type field is set to a third set value. If the current attribute parameter set is only effective for a specific type of attribute data in the current sample, the reference attribute type flag field is set to a first preset value (such as 1). If the current attribute parameter set is effective for a specific group of attribute data in the current sample, the reference attribute type flag field is set to a second preset value (such as 0).

b. When the media file conforms to a second encoding standard (such as MPEG), the parameter component track includes a component information box and a configuration box. A parameter set type corresponding to a setup unit included in the configuration box is the same as a parameter set type indicated by the component information box. The setup unit may include a data unit of a sequence parameter set (SPS), a geometry parameter set (GPS), an attribute parameter set (APS), or point cloud tile information. The component information box includes at least one of the following fields: a component type field, a parameter setting type quantity field, and a parameter setting type field. The component type field is configured for indicating a type of a component in the parameter component track. The parameter setting type quantity field is configured for indicating a quantity of parameter sets included in the parameter component track. The parameter setting type field is configured for indicating the type of parameter set included in the parameter component track.

At this point, encapsulating the attribute parameter set in the point cloud code stream into the parameter component track may include: If the type of the component in the parameter component track indicates a parameter set, the component type field is set to a target set value. If the type of the parameter set included in the parameter component track indicates an attribute parameter set, the parameter setting type field is set to a first preset value (such as 0). If the type of the parameter set included in the parameter component track indicates a geometry parameter set, the parameter setting type field is set to a second preset value (such as 1). If the type of the parameter set included in the parameter component track indicates a sequence parameter set, the parameter setting type field is set to a third preset value (such as 2).

(3) The media file includes a geometry component track, and the attribute parameter set is encapsulated in the geometry component track.

When the point cloud code stream is encapsulated into a plurality of tracks by using a multi-track mode, the attribute parameter set may be encapsulated to the geometry parameter component track. In some embodiments, the attribute parameter set and the geometry data in the point cloud code stream are encapsulated into the geometry component track, and the attribute data in the point cloud code stream is encapsulated into the attribute component track, thus forming the media file of the point cloud media. At this point, the media file may include the geometry component track and the attribute component track. The attribute parameter set indication information is configured for indicating that the attribute parameter set is encapsulated in the geometry component track. The geometry component track includes one or more samples. Each sample corresponds to one point cloud frame, and each sample includes parameter information required by decoding of attribute data of the corresponding point cloud frame.

In some embodiments, the geometry component track includes a component information box, and the component information box includes a component type field. The component type field is configured for indicating the type of component in the geometry component track. If the type of the component in the geometry component track indicates geometry data and a parameter set, the component type field may be set to a first set value (such as 2).

(4) The media file includes one or more attribute component tracks; and the attribute parameter set is encapsulated in each attribute component track. The attribute parameter sets encapsulated in the various attribute component tracks are obtained by copying the same attribute parameter set.

In some embodiments, the attribute data in the point cloud code stream may be encapsulated into one or more attribute component tracks by using the multi-track mode, and the attribute parameter set may be copied. Then, one attribute parameter set is encapsulated into each attribute component track to form the media file of the point cloud media. The attribute parameter set indication information is configured for indicating that the attribute parameter set is encapsulated in each attribute track.

(5) The media file includes one or more attribute component tracks; the attribute parameter set includes an index; and the index of the attribute parameter set is encapsulated in each attribute component track.

In some embodiments, the attribute data in the point cloud code stream is encapsulated into one or more attribute component tracks by using a multi-track mode, and the index of the attribute parameter set in the point cloud code stream is encapsulated into each attribute component track to form the media file of the point cloud media. The attribute parameter set may be found through the index encapsulated in any attribute component track, or a data unit formed by reorganizing the attribute parameter set may be found through the index encapsulated in any attribute component track. The data unit formed by reorganizing the attribute parameter set refers to indexing the samples of different types of attribute component tracks and the corresponding attribute parameter sets to the same data unit after the point cloud code stream is reorganized.

In some embodiments, in a streaming transmission mode, the media file of the point cloud media is transmitted through a transmission signaling. If the attribute parameter set is independently encapsulated in the parameter component track, the transmission signaling includes stream indication information, and the stream indication information is configured for indicating a data stream corresponding to the parameter component track. The transmission signaling may be a DASH signaling. The above stream indication information may refer to a component descriptor. The component descriptor is set to the data stream corresponding to the parameter component track. The component descriptor includes a component type element and a parameter type element; and the component type element is configured for indicating the type of the component in the parameter component track. If the type of the component in the parameter component track indicates a parameter set component, the component type element in the component descriptor is set to a target character. The parameter type element is configured for indicating the type of the parameter set included in the parameter component track.

In some embodiments, point cloud media is obtained; the point cloud media is encoded to obtain a point cloud code stream and an attribute parameter set, the attribute parameter set including parameter information required by decoding of attribute data in the point cloud code stream; and the point cloud code stream is encapsulated to obtain a media file of the point cloud media. The media file further includes attribute parameter set indication information, and the attribute parameter set indication information is configured for indicating an encapsulation position of the attribute parameter set. Adding the attribute parameter set indication information into the media file can facilitate a media processing device to directly obtain the attribute parameter set according to the attribute parameter set indication information, thereby guiding the transmission, decoding, and presentation of the point cloud media, and reducing certain encoding and decoding dependencies.

The data processing method for the point cloud media provided by some embodiments will be described in detail below through three complete examples:

Embodiment I

1. A content production device may acquire point cloud media, and encode attribute data in the point cloud media according to an attribute parameter set to obtain an attribute code stream. The code production device encodes geometry data in the point cloud media according to a geometry parameter set to obtain a geometry code stream. After the attribute code stream and the geometry code stream are combined, a point cloud code stream is generated. The point cloud code stream further includes the attribute parameter set. During file encapsulation performed on the point cloud code stream, the attribute parameter set in the point cloud code stream is encapsulated into a parameter component track by using a multi-track mode. The attribute data in the point cloud code stream is encapsulated into an attribute component track, and the geometry data in the point cloud code stream is encapsulated into a geometry component track, thus forming a media file of the point cloud media. At this time, the media file may include attribute parameter set indication information. The attribute parameter set indication information is configured for indicating that the attribute parameter set is encapsulated into the parameter component track. After the encapsulation, information of all the tracks is as follows:

Track1: geometry component track {GPCCComponentInfoBox: gpcc_type=2}, where the geometry component track includes a component information box GPCCComponentInfoBox. The component information box includes a component type field gpcc_type, and gpcc_type=2 indicates that a type of a component in the geometry component track indicates geometry data.

Track2: Attribute component track-color {GPCCComponentInfoBox: gpcc_type=4, attr_type=0}. Where the attribute component track includes a component information box GPCCComponentInfoBox, and the component information box includes a component type field gpcc_type and an attribute type field attr_type; gpcc_type=4 indicates that the type of the component in the geometry component track indicates attribute data; and attr_type=0 indicates that the type of the attribute component indicates color.

Track3: Attribute component track-reflectivity {GPCCComponentInfoBox: gpcc_type=4, attr_type=1}. The attribute component track includes a component information box GPCCComponentInfoBox. The component information box includes a component type field gpcc_type and an attribute type field attr_type; gpcc_type=4 indicates that the type of the component in the attribute component track indicates attribute data; and attr_type=1 indicates that the type of the attribute component indicates reflectivity.

Track4: Parameter component track {GPCCComponentInfoBox: gpcc_type=5, parameter_set_type=0}; {TrackReferenceTypeBox: reference_type='appr', track_id=(2,3)}. Where the parameter component track includes a component information box GPCCComponentInfoBox. The component information box includes a component type field gpcc_type and a parameter setting type field parameter_set_type; and gpcc_type=5 indicates that the type of the component in the parameter component track indicates an attribute parameter set. The parameter component track further includes a track reference type box TrackReferenceTypeBox, and a reference type reference_type of the track reference type box is 'appr'. The track reference type box is configured for associating the parameter component track with the attribute component track corresponding to the attribute parameter set in the parameter component track; and track_id=(2, 3) indicates that the attribute parameter set in the parameter component track (track4) is associated with track2 and track3.

2. The content production device may use a transmission signaling to transmit the media file to a media processing device. The transmission signaling includes stream indication information. The stream indication information is configured for indicating a data stream component@component_type='prms' corresponding to the parameter component track. The component type element component_type='prms' is configured for indicating that the type of the component in the parameter component track indicates a parameter set component.

Assuming that Track1 to Track4 correspond to Representation1 to Representation4 respectively.

3. The media processing device may request the corresponding media file according to the stream indication information included in the transmission signaling. At this time, as long as the media processing device needs to request attribute data, the media processing device will definitely request a data stream, namely Representation4, corresponding to the parameter component track.

4. After obtaining the data stream corresponding to the parameter component track, the media processing device may de-encapsulate and decode the media file. The media processing device may obtain the attribute parameter set from the parameter component track track4 according to the attribute parameter set indication information, and partially decode the relevant point cloud media according to the attribute parameter set, so as to save decoding resources to the largest extent. If the media processing device only needs to decode a color attribute, track4 and track2 may be decoded. In some embodiments, the parameter component track track4 may be first decoded to obtain the attribute parameter set; and the attribute component track corresponding to the color attribute data is then decoded according to the attribute parameter set to obtain the color attribute data in the point cloud media.

5. The media processing device may render the color attribute data in the point cloud media and present the point cloud media.

Embodiment II

1. A content production device may acquire point cloud media, and encode attribute data in the point cloud media according to an attribute parameter set to obtain an attribute code stream. The code production device encodes geometry data in the point cloud media according to a geometry parameter set to obtain a geometry code stream. After the attribute code stream and the geometry code stream are combined, a point cloud code stream is generated. The point cloud code stream further includes the attribute parameter set. During file encapsulation performed on the point cloud code stream, the attribute parameter set and the geometry data in the point cloud code stream are encapsulated into the geometry component track by using a multi-track mode, and the attribute data in the point cloud code stream is encapsulated into the attribute component track, thus forming the media file of the point cloud media. At this time, the media file may include attribute parameter set indication information. The attribute parameter set indication information is configured for indicating that the attribute parameter set is encapsulated into the geometry component track. After the encapsulation, information of all the tracks is as follows:

Track1: geometry component track {GPCCComponentInfoBox: gpcc_type=2}, where the geometry component track includes a component information box GPCCComponentInfoBox. The component information box includes a component type field gpcc_type, and gpcc_type=2 indicates that a type of a component in the geometry component track indicates geometry data and a parameter set. The parameter set includes the attribute parameter set.

Track2: Attribute component track-color {GPCCComponentInfoBox: gpcc_type=4, attr_type=0}. Where the attribute component track includes a component information box GPCCComponentInfoBox, and the component information box includes a component type field gpcc_type and an attribute type field attr_type; gpcc_type=4 indicates that the type of the component in the geometry component track indicates attribute data; and attr_type=0 indicates that the type of the attribute component indicates color.

Track3: Attribute component track-reflectivity {GPCCComponentInfoBox: gpcc_type=4, attr_type=1}. The attribute component track includes a component information box GPCCComponentInfoBox. The component information box includes a component type field gpcc_type and an attribute type field attr_type; gpcc_type=4 indicates that the type of the component in the attribute component track indicates attribute data; and attr_type=1 indicates that the type of the attribute component indicates reflectivity.

2. The content production device may transmit the media file to a media processing device.

3. When de-encapsulating and decoding the media file, the media processing device may obtain the attribute parameter set from the geometry component track track1 according to the attribute parameter set indication information, and partially decode the relevant point cloud media according to the attribute parameter set, so as to save decoding resources to the largest extent. If the media processing device only needs to decode color attribute data, track1 and track2 may be decoded. In some embodiments, the geometry component track track1 may be first decoded to obtain the attribute parameter set; and the attribute component track track2 corresponding to the color attribute data is then decoded according to the attribute parameter set to obtain the color attribute data in the point cloud media.

5. The media processing device may render the color attribute data in the point cloud media and present the point cloud media.

Embodiment III

1. A content production device may acquire point cloud media. The code production device then encodes attribute data in the point cloud media according to an attribute parameter set to obtain an attribute code stream, and encodes geometry data in the point cloud media according to a geometry parameter set to obtain a geometry code stream. After the attribute code stream and the geometry code stream are combined, a point cloud code stream is generated. The point cloud code stream further includes the attribute parameter set. During file encapsulation performed on the point cloud code stream, by using a multi-track mode, color attribute data in the point cloud code stream is encapsulated into an attribute component track (track2) corresponding to the color attribute data; reflectivity attribute data in the point cloud code stream is encapsulated into an attribute component track (track3) corresponding to the reflectivity attribute data; geometry data in the point cloud code stream is encapsulated into a geometry component track; the attribute parameter set is respectively encapsulated into the attribute component track corresponding to the color attribute data and the attribute component track corresponding to the reflectivity attribute data, thus forming a media file of the point cloud media. At this time, the media file may include attribute parameter set indication information. The attribute parameter set indication information is configured for indicating that the attribute parameter set is encapsulated into each attribute component track. Information of all the tracks is as follows:

Track1: geometry component track {GPCCComponentInfoBox: gpcc_type=2}, where the geometry component track includes a component information box GPCCComponentInfoBox. The component information box includes a component type field gpcc_type, and gpcc_type=2 indicates that a type of a component in the geometry component track indicates geometry data.

Track2: Attribute component track-color {GPCCComponentInfoBox: gpcc_type=4, attr_type=0}. Where the attribute component track includes a component information box GPCCComponentInfoBox, and the component information box includes a component type field gpcc_type and an attribute type field attr_type; gpcc_type=4 indicates that the type of the component in the geometry component track indicates attribute data; and attr_type=0 indicates that the type of the attribute component indicates color. The attribute component track includes the attribute parameter set.

Track3: Attribute component track-reflectivity {GPCCComponentInfoBox: gpcc_type=4, attr_type=1}. The attribute component track includes a component information box GPCCComponentInfoBox. The component information box includes a component type field gpcc_type and an attribute type field attr_type; gpcc_type=4 indicates that the type of the component in the attribute component track indicates attribute data; and attr_type=1 indicates that the type of the attribute component indicates reflectivity. The attribute component track includes the attribute parameter set.

2. The content production device transmits the media file to a media processing device.

3. The media processing device may partially decode the relevant point cloud media according to a need. If the media processing device only needs to decode color attribute data, track2 may be directly decoded. In some embodiments, the attribute component track corresponding to the color attribute data may be directly decoded according to the attribute parameter set indication information to obtain the color attribute data in the point cloud media.

4. The media processing device may render the color attribute data in the point cloud media and present the point cloud media.

The above embodiments are examples, and can be flexibly selected or combined for use according to the encapsulation position of the attribute parameter set and an actual need. This is not limited herein.

In some embodiments, a media file of point cloud media is obtained, the media file including a point cloud code stream of the point cloud media and an attribute parameter set. The attribute parameter set includes parameter information required by decoding of attribute data in the point cloud code stream; and the attribute parameter set indication information is configured for indicating an encapsulation position of the attribute parameter set. The encapsulation position of the attribute parameter set can be directly obtained according to the attribute parameter set indication information, and the point cloud code stream can be decoded based on the attribute parameter set to present the point cloud media. Transmission, decoding, and presentation of the point cloud media are guided; unnecessary encoding and decoding dependencies can be reduced; and transmission resources and computation resources can be saved.

Figure 6:
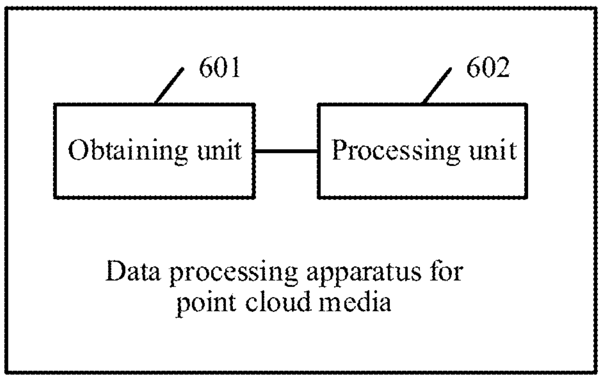
FIG. 6 is a schematic structural diagram of a data processing apparatus for point cloud media according to some embodiments.

FIG. 6 is a schematic structural diagram of a data processing apparatus for point cloud media according to some embodiments. The data processing apparatus for the point cloud media may be arranged in a computer device according to some embodiments. The computer device may be the media processing device mentioned in the above method embodiments. The data processing apparatus for the point cloud media shown in FIG. 6 may be a computer program (including program codes) run in the computer device. The data processing apparatus for the point cloud media may be configured to perform a portion or an entirety of the operations in the method embodiment shown in FIG. 3. Referring to FIG. 6, the data processing apparatus for the point cloud media includes the following units:

an obtaining unit 601, configured to obtain a media file of point cloud media, the media file including a point cloud code stream of the point cloud media and an attribute parameter set, the attribute parameter set including parameter information required by decoding of attribute data in the point cloud code stream; the media file further including attribute parameter set indication information, and the attribute parameter set indication information being configured for indicating an encapsulation position of the attribute parameter set; and a processing unit 602, configured to decode the point cloud code stream according to the attribute parameter set indication information to present the point cloud media.

In some embodiments, the media file includes a track; the track includes one or more samples; one sample corresponds to a point cloud frame in the point cloud media; a sample is divided into one or more subsamples, and each subsample includes a type of point cloud data; and the media file further includes a subsample information box; and the attribute parameter set is encapsulated in the subsample information box.

In some embodiments, the attribute parameter set indication information is represented as the subsample information box, and the attribute parameter set indication information is further configured for indicating a relationship between the attribute parameter set and the attribute data in the point cloud code stream;

the subsample box includes at least one of the following fields: a payload type field, a reference attribute information flag field, a reference attribute type flag field, a reference attribute identifier field, and a reference attribute type field;

the payload type field is configured for indicating a type of point cloud data included in each subsample; if the payload type field is a first value, the type of the point cloud data included in each subsample is an attribute parameter set; if the payload type field is a second value, the type of the point cloud data included in each subsample is a geometry parameter set, and the geometry parameter set includes parameter information required by decoding of geometry data;

the reference attribute information flag field is configured for indicating an effective range of a current attribute parameter set for attribute data; if the reference attribute information flag field is a first preset value, the current attribute parameter set is only effective for a specific group or type of attribute data in a current sample; if the reference attribute information flag field is a second preset value, the current attribute parameter set is effective for all attribute data in the current sample;

the reference attribute type flag field is configured for indicating a type of attribute data for which the current attribute parameter set is effective; if the reference attribute type flag field is a first numerical value, the current attribute parameter set is only effective for one specific type of attribute data in the current sample; if the reference attribute type flag field is a second numerical value, the current attribute parameter set is only effective for a specific group of attribute data in the current sample;

the reference attribute identifier field is configured for indicating an identifier of attribute data corresponding to the current attribute parameter set; the reference attribute type field is configured for indicating a type of the attribute data corresponding to the current attribute parameter set; and the current attribute parameter set refers to an attribute parameter set being used, and the current sample refers to a sample being decoded.

In some embodiments, the point cloud code stream is encapsulated into the media file in a multi-track mode. The media file includes a parameter component track; and the attribute parameter set is independently encapsulated in the parameter component track.

The parameter component track includes one or more samples; each sample corresponds to a point cloud frame of the point cloud media; and each sample includes parameter information required by decoding of attribute data of the corresponding point cloud frame.

In some embodiments, the media file includes one or more parameter component tracks; when the media file only includes one parameter component track, the attribute parameter set in the point cloud code stream is encapsulated into the parameter component track; and when the media file includes a plurality of parameter component tracks, the attribute parameter set in the point cloud code stream is encapsulated into a separate parameter component track or the attribute parameter set in the point cloud code stream is encapsulated into the plurality of parameter component tracks based on types.

In some embodiments, the parameter component track includes a track box.

The track box includes a track reference type box; and the track reference type box is configured for indicating that the parameter component track is associated with one or more attribute component tracks corresponding to the attribute parameter set in the parameter component track.

In some embodiments, the media file conforms to a first encoding standard. The parameter component track includes a component information box; and the component information box is arranged in a header sample entry of the parameter component track. The component information box includes at least one of the following fields: a component type field, a header type field, an attribute header quantity field, a reference attribute type flag field, a reference attribute identifier field, and a reference attribute type field.

The component type field is configured for indicating a type of a component in the parameter component track. When the component type field is set to a target preset value, the type of the component in the parameter component track indicates a parameter set.

The header type field is configured for indicating a type of a parameter set included in the parameter component track. If the header type field is a first set value, the type of the parameter set included in the parameter component track indicates an attribute parameter set. If the header type field is a second set value, the type of the parameter set included in the parameter component track indicates a geometry parameter set. If the header type field is a third set value, the type of the parameter set included in the parameter component track indicates both a geometry parameter set and an attribute parameter set.

The attribute header quantity field is configured for indicating a quantity of attribute parameter sets included in each sample in the parameter component track. An order of the attribute parameter sets included in the sample is consistent with an order of identifiers of the attribute parameter sets or types of the attribute parameter sets indicated in the component information box.

The reference attribute type field is configured for indicating a type of attribute data for which a current attribute parameter set is effective. If the reference attribute type flag field is a first preset value, the current attribute parameter set is only effective for one specific type of attribute data in a current sample. If the reference attribute type flag field is a second preset value, the current attribute parameter set is effective for a specific group of attribute data in the current sample.

The reference attribute identifier field is configured for indicating an identifier of attribute data corresponding to the current attribute parameter set.

The reference attribute type field is configured for indicating a type of the attribute data corresponding to the current attribute parameter set.

The current attribute parameter set refers to an attribute parameter set being used, and the current sample refers to a sample being decoded.

In some embodiments, the media file conforms to a second encoding standard. The parameter component track includes a component information box and a configuration box. A parameter set type corresponding to a setup unit included in the configuration box is the same as a parameter set type indicated by the component information box.

The component information box includes at least one of the following fields: a component type field, a parameter setting type quantity field, and a parameter setting type field;

The component type field is configured for indicating a type of a component in the parameter component track. If the component type field is a target set value, the type of the component in the parameter component track indicates a parameter set.

The parameter setting type quantity field is configured for indicating a quantity of parameter sets included in the parameter component track.

The parameter setting type field is configured for indicating the type of parameter set included in the parameter component track. If the parameter setting type field is a first preset value, the type of the parameter sets included in the parameter component track indicates attribute parameter sets. If the parameter setting type field is a second preset value, the type of the parameter sets included in the parameter component track indicate geometry parameter sets. If the parameter setting type field is a third preset value, the type of the parameter sets included in the parameter component track indicate sequence parameter sets.

In some embodiments, the media file includes a geometry component track; and the attribute parameter set is independently encapsulated in the geometry component track.

In some embodiments, the geometry component track includes a component information box, and the attribute parameter set indication information is represented as the component information box;

the component information box includes a component type field; the component type field is configured for indicating a type of a component in the geometry component track; if the component type field is a first set value, the type of the component in the geometry component track indicates a geometry data and a parameter set; and the parameter set includes an attribute parameter set and a geometry parameter set.

In some embodiments, the media file includes one or more attribute component tracks; and the attribute parameter set is encapsulated in each attribute component track.

The attribute parameter sets encapsulated in the various attribute component tracks are obtained by copying the same attribute parameter set.

In some embodiments, the media file includes one or more attribute component tracks; the attribute parameter set includes an index; and the index of the attribute parameter set is encapsulated in each attribute component track.

The index encapsulated in any attribute component track is configured for searching for the attribute parameter set, or configured for searching for a data unit formed by reorganizing the attribute parameter set.

In some embodiments, the point cloud media is transmitted by using a streaming transmission mode. When the obtaining unit 601 obtains the media file of the point cloud media, the obtaining unit may be configured to:

obtain a transmission signaling of the point cloud media, the transmission signaling including stream indication information, and the stream indication information being configured for indicating a data stream corresponding to the parameter component track; and obtain the media file of the point cloud media based on the transmission signaling.

In some embodiments, the transmission signaling is a dynamic adaptive stream signaling; the stream indication information refers to a component descriptor; the component descriptor is configured on the data stream corresponding to the parameter component track; the component descriptor includes a component type element and a parameter type element; and the component type element is configured for indicating the type of the component in the parameter component track. The parameter type element is configured for indicating the type of the parameter set included in the parameter component track.

If the component type element is a target character, the type of the component in the parameter component track indicates a parameter set component.

In some embodiments, when the processing unit 602 decodes the point cloud code stream according to the attribute parameter set indication information to present the point cloud media, the processing unit may be configured to:

obtain the attribute parameter set according to an encapsulation position indicated by the attribute parameter set indication information; and decode the attribute data in the point cloud code stream by using the parameter information in the attribute parameter set to present the point cloud media.

In the embodiments of this application, a media file of point cloud media is obtained, the media file including a point cloud code stream of the point cloud media and an attribute parameter set. The attribute parameter set includes parameter information required by decoding of attribute data in the point cloud code stream; and the attribute parameter set indication information is configured for indicating an encapsulation position of the attribute parameter set. The encapsulation position of the attribute parameter set can be directly obtained according to the attribute parameter set indication information, and the point cloud code stream can be decoded based on the attribute parameter set to present the point cloud media. Transmission, decoding, and presentation of the point cloud media are guided; unnecessary encoding and decoding dependencies can be reduced; and transmission resources and computation resources can be saved.

Figure 7:
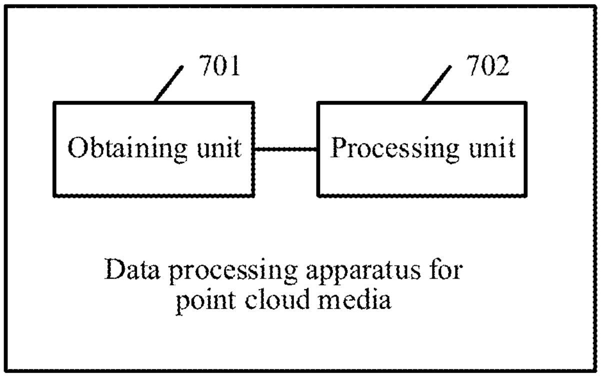
FIG. 7 is a schematic structural diagram of a data processing apparatus for point cloud media according to some embodiments.

FIG. 7 is a schematic structural diagram of a data processing apparatus for point cloud media according to some embodiments. The data processing apparatus for the point cloud media may be arranged in a computer device according to some embodiments. The computer device may be the content production device mentioned in the above method embodiments. The data processing apparatus for the point cloud media shown in FIG. 7 may be a computer program (including program codes) run in the computer device. The data processing apparatus for the point cloud media may be configured to perform a portion or an entirety of the operations in the method embodiment shown in FIG. 5. Referring to FIG. 7, the data processing apparatus for the point cloud media includes the following units:

an obtaining unit 701, configured to obtain point cloud media; and a processing unit 702, configured to encode the point cloud media to obtain a point cloud code stream and an attribute parameter set, the attribute parameter set including parameter information required by decoding of attribute data in the point cloud code stream;

the processing unit 702 being further configured to encapsulate the point cloud code stream to obtain a media file of the point cloud media, the media file further including attribute parameter set indication information, and the attribute parameter set indication information being configured for indicating an encapsulation position of the attribute parameter set.

In some embodiments, the media file includes a track, and the point cloud code stream is encapsulated in the track. The track includes one or more samples, and each sample corresponds to a point cloud frame in the point cloud media. A sample is divided into one or more subsamples, and each subsample includes a type of point cloud data; and the media file further includes a subsample information box; and the attribute parameter set is encapsulated in the subsample information box.

In some embodiments, the point cloud code stream is encapsulated into the media file in a multi-track mode. The media file includes a parameter component track; and the attribute parameter set is independently encapsulated in the parameter component track.

The parameter component track includes one or more samples; each sample corresponds to a point cloud frame of the point cloud media; and each sample includes parameter information required by decoding of attribute data of the corresponding point cloud frame.

In some embodiments, the media file includes a geometry component track; and the attribute parameter set is independently encapsulated in the geometry component track.

In some embodiments, the media file includes one or more attribute component tracks; and the attribute parameter set is encapsulated in each attribute component track.

The attribute parameter sets encapsulated in the various attribute component tracks are obtained by copying the same attribute parameter set.

In some embodiments, the media file includes one or more attribute component tracks; the attribute parameter set includes an index; and the index of the attribute parameter set is encapsulated in each attribute component track.

The index encapsulated in any attribute component track is configured for searching for the attribute parameter set, or configured for searching for a data unit formed by reorganizing the attribute parameter set.

In some embodiments, the processing unit 702 is further configured to:

transmit the media file of the point cloud media through a transmission signaling, the transmission signaling including stream indication information, and the stream indication information being configured for indicating a data stream corresponding to the parameter component track.

In some embodiments, point cloud media is obtained; the point cloud media is encoded to obtain a point cloud code stream and an attribute parameter set, the attribute parameter set including parameter information required by decoding of attribute data in the point cloud code stream; and the point cloud code stream is encapsulated to obtain a media file of the point cloud media. The media file further includes attribute parameter set indication information, and the attribute parameter set indication information is configured for indicating an encapsulation position of the attribute parameter set. Adding the attribute parameter set indication information into the media file can facilitate a media processing device to directly obtain the attribute parameter set according to the attribute parameter set indication information, thereby guiding the transmission, decoding, and presentation of the point cloud media, and reducing certain encoding and decoding dependencies.

A person skilled in the art would understand that these "units" could be implemented by hardware logic, a processor or processors executing computer software code, or a combination of both. The "units" may also be implemented in software stored in a memory of a computer or a non-transitory computer-readable medium, where the instructions of each unit are executable by a processor to thereby cause the processor to perform the respective operations of the corresponding unit.

Figure 8:
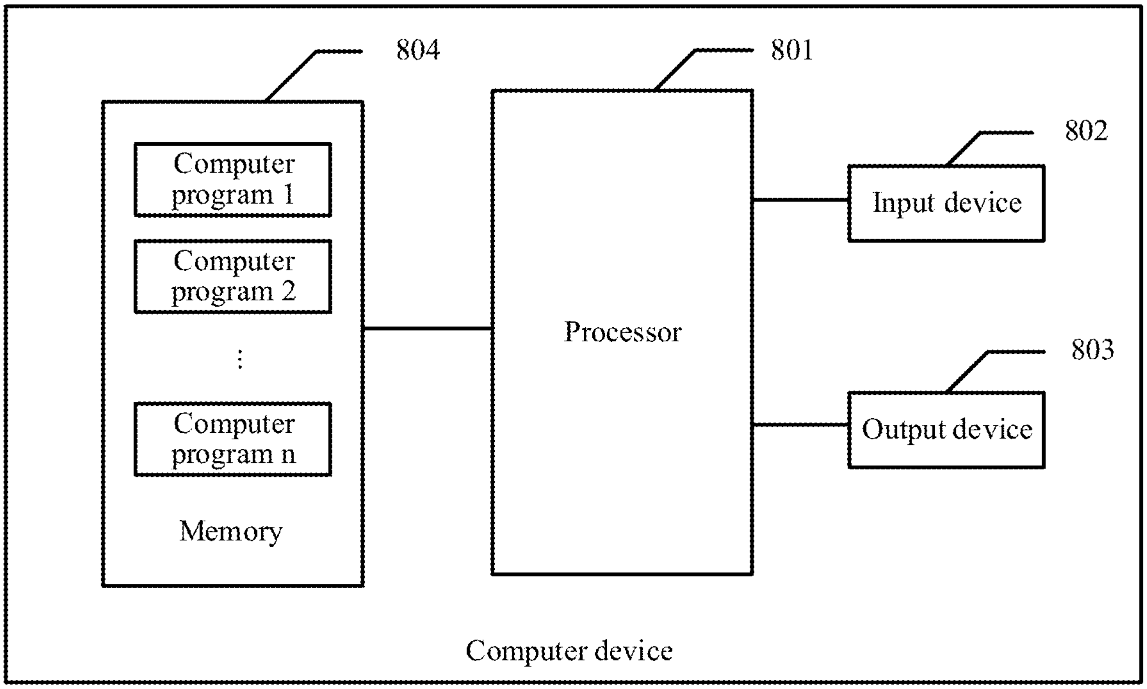
FIG. 8 is a schematic structural diagram of a computer device according to some embodiments.

Further, some embodiments further provide a computer device. The schematic structural diagram of the computer device is shown in FIG. 8. The computer device may be the above media processing device or the content production device. The computer device may include: a processor 801, an input device 802, an output device 803, and a memory 804. The processor 801, the input device 802, the output device 803, and the memory 804 are connected by a bus. The memory 804 is configured to store a computer program. The computer program includes computer instructions, and the processor 801 is configured to execute the computer instructions stored in the memory 804.

When the computer device is the above media processing device, in the embodiments of this application, by running executable program codes in the memory 804, the processor 801 performs the following operations:

obtaining a media file of point cloud media, the media file including a point cloud code stream of the point cloud media and an attribute parameter set, the attribute parameter set including parameter information required by decoding of attribute data in the point cloud code stream; the media file further including attribute parameter set indication information, and the attribute parameter set indication information being configured for indicating an encapsulation position of the attribute parameter set; and decoding the point cloud code stream according to the attribute parameter set indication information to present the point cloud media.

In some embodiments, a media file of point cloud media is obtained, the media file including a point cloud code stream of the point cloud media and an attribute parameter set. The attribute parameter set includes parameter information required by decoding of attribute data in the point cloud code stream; and the attribute parameter set indication information is configured for indicating an encapsulation position of the attribute parameter set. The encapsulation position of the attribute parameter set can be directly obtained according to the attribute parameter set indication information, and the point cloud code stream can be decoded based on the attribute parameter set to present the point cloud media. Transmission, decoding, and presentation of the point cloud media are guided; unnecessary encoding and decoding dependencies can be reduced; and transmission resources and computation resources can be saved.

In some embodiments, when the computer device is the above content production device, in some embodiments, by running executable program codes in the memory 804, the processor 801 performs the following operations:

obtaining point cloud media;

encoding the point cloud media to obtain a point cloud code stream and an attribute parameter set, the attribute parameter set including parameter information required by decoding of attribute data in the point cloud code stream; and encapsulating the point cloud code stream to obtain a media file of the point cloud media, the media file further including attribute parameter set indication information, and the attribute parameter set indication information being configured for indicating an encapsulation position of the attribute parameter set.

In some embodiments, point cloud media is obtained; the point cloud media is encoded to obtain a point cloud code stream and an attribute parameter set, the attribute parameter set including parameter information required by decoding of attribute data in the point cloud code stream; and the point cloud code stream is encapsulated to obtain a media file of the point cloud media. The media file further includes attribute parameter set indication information, and the attribute parameter set indication information is configured for indicating an encapsulation position of the attribute parameter set. Adding the attribute parameter set indication information into the media file can facilitate a media processing device to directly obtain the attribute parameter set according to the attribute parameter set indication information, thereby guiding the transmission, decoding, and presentation of the point cloud media, and reducing certain encoding and decoding dependencies.

In addition, some embodiments provide a non-transitory computer-readable storage medium. The computer-readable storage medium stores a computer program, and the computer program includes program instructions. When a processor executes the program instructions, the methods in the embodiments corresponding to FIG. 3 and FIG. 5 above can be performed. Therefore, this will not be elaborated here. For technical details that are not disclosed in the computer-readable storage medium embodiments, refer to the descriptions of the method embodiments. As an example, the program instructions may be deployed on one computing device for execution, or on a plurality of computing devices located at one site for execution, or on a plurality of computing devices distributed at a plurality of sites and interconnected by a communication network for execution.

Some embodiments provide a computer program product. The computer program product includes a computer program. The computer program is stored in a computer-readable storage medium. A processor of a computer device reads the computer program from the computer-readable storage medium and runs the computer program, causing the computer device to implement the methods in the embodiments corresponding to FIG. 3 and FIG. 5 above. Therefore, this will not be elaborated here.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The storage medium may include a magnetic disc, a CD, a read-only memory (ROM), a random access memory (RAM), or the like.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A data processing method for point cloud media, performed by at least one processor, comprising:

obtaining a media file of point cloud media, the media file comprising a point cloud code stream of the point cloud media, an attribute parameter set, attribute parameter set indication information, a track, and a subsample information box, wherein the attribute parameter set comprises parameter information required by decoding of attribute data in the point cloud code stream, the attribute parameter set being encapsulated in the subsample information box, wherein the attribute parameter set indication information indicates an encapsulation position of the attribute parameter set, the attribute parameter set indication information representing the subsample information box, and the attribute parameter set indication information indicating a relationship between the attribute parameter set and the attribute data in the point cloud code stream, wherein the track comprises one or more samples divided into one or more subsamples, each sample corresponding to a point cloud frame in the point cloud media, and each subsample comprising a type of point cloud data, wherein the subsample information box comprises at least one of a payload type field, a reference attribute information flag field, a reference attribute type flag field, a reference attribute identifier field, or a reference attribute type field; and decoding the point cloud code stream according to the attribute parameter set indication information to present the point cloud media.

2. The data processing method according to claim 1, wherein the point cloud code stream is encapsulated in the media file in a multi-track mode; the media file comprises a parameter component track; the attribute parameter set is independently encapsulated in the parameter component track; and wherein the parameter component track comprises one or more samples; each sample corresponds to a point cloud frame of the point cloud media; and each sample comprises parameter information required by decoding of the attribute data of a corresponding point cloud frame.

3. The data processing method according to claim 2, wherein the media file comprises one or more parameter component tracks;

when the media file only comprises one parameter component track, the attribute parameter set in the point cloud code stream is encapsulated into the parameter component track; and when the media file comprises a plurality of parameter component tracks, the attribute parameter set in the point cloud code stream is encapsulated into a separate parameter component track or the attribute parameter set in the point cloud code stream is encapsulated into the plurality of parameter component tracks based on types.

4. The data processing method according to claim 2, wherein the parameter component track comprises a track box; and the track box comprises a track reference type box; and the track reference type box is configured for indicating that the parameter component track is associated with one or more attribute component tracks corresponding to the attribute parameter set in the parameter component track.

5. The data processing method according to claim 2, wherein the parameter component track comprises a component information box; the component information box is arranged in a header sample entry of the parameter component track; and wherein the component information box comprises at least one of a component type field, a header type field, an attribute header quantity field, a reference attribute type flag field, a reference attribute identifier field, or a reference attribute type field.

6. The data processing method according to claim 2, wherein the parameter component track comprises a component information box and a configuration box; a parameter set type corresponding to a setup unit comprised in the configuration box is the same as a parameter set type indicated by the component information box; and the component information box comprises at least one of a component type field, a parameter setting type quantity field, or a parameter setting type field.

7. The data processing method according to claim 1, wherein the media file comprises a geometry component track, and the attribute parameter set is encapsulated in the geometry component track.

8. The method according to claim 7, wherein the geometry component track comprises a component information box, and the attribute parameter set indication information is represented as the component information box; and the component information box comprises a component type field; the component type field is configured for indicating a type of a component in the geometry component track; if the component type field is a first set value, the type of the component in the geometry component track indicates a geometry data and a parameter set; and the parameter set comprises the attribute parameter set and a geometry parameter set.

9. The data processing method according to claim 1, wherein the media file comprises one or more attribute component tracks; the attribute parameter set is encapsulated in each attribute component track; and the attribute parameter sets encapsulated in the various attribute component tracks are obtained by copying the same attribute parameter set.

10. The data processing method according to claim 1, wherein the media file comprises one or more attribute component tracks; the attribute parameter set comprises an index; the index of the attribute parameter set is encapsulated in each attribute component track; and the index encapsulated in any attribute component track is configured for searching for the attribute parameter set, or configured for searching for a data unit formed by reorganizing the attribute parameter set.

11. The data processing method according to claim 2, wherein the point cloud media is transmitted by using a streaming transmission mode; the obtaining the media file of point cloud media comprises:

obtaining a transmission signaling of the point cloud media, the transmission signaling comprising stream indication information, and the stream indication information being configured for indicating a data stream corresponding to the parameter component track; and obtaining the media file of the point cloud media based on the transmission signaling.

12. The data processing method according to claim 11, wherein the transmission signaling is a dynamic adaptive stream signaling; the stream indication information refers to a component descriptor; the component descriptor is configured on the data stream corresponding to the parameter component track; the component descriptor comprises a component type element and a parameter type element; the component type element is configured for indicating the type of the component in the parameter component track; the parameter type element is configured for indicating the type of the parameter set comprised in the parameter component track; and if the component type element is a target character, the type of the component in the parameter component track indicates a parameter set component.

13. The data processing method according to claim 1, wherein the decoding the point cloud code stream according to the attribute parameter set indication information to present the point cloud media comprises:

obtaining the attribute parameter set according to an encapsulation position indicated by the attribute parameter set indication information; and decoding the attribute data in the point cloud code stream by using the parameter information in the attribute parameter set to present the point cloud media.

14. The data processing method according to claim 1, wherein:

the payload type field is configured for indicating a type of point cloud data comprised in each subsample; if the payload type field is a first value, the type of the point cloud data comprised in each subsample is the attribute parameter set; if the payload type field is a second value, the type of the point cloud data comprised in each subsample is a geometry parameter set, and the geometry parameter set comprises parameter information required by decoding of geometry data;

the reference attribute information flag field is configured for indicating an effective range of a current attribute parameter set for the attribute data; if the reference attribute information flag field is a first preset value, the current attribute parameter set is only effective for a specific group or type of attribute data in a current sample; if the reference attribute information flag field is a second preset value, the current attribute parameter set is effective for all attribute data in the current sample;

the reference attribute type flag field is configured for indicating a type of attribute data for which the current attribute parameter set is effective; if the reference attribute type flag field is a first numerical value, the current attribute parameter set is only effective for one specific type of attribute data in the current sample; if the reference attribute type flag field is a second numerical value, the current attribute parameter set is only effective for a specific group of attribute data in the current sample;

the reference attribute identifier field is configured for indicating an identifier of attribute data corresponding to the current attribute parameter set; the reference attribute type field is configured for indicating a type of the attribute data corresponding to the current attribute parameter set; and the current attribute parameter set refers to the attribute parameter set being used, and the current sample refers to a sample being decoded.

15. The data processing method according to claim 5, wherein:

the component type field is configured for indicating a type of a component in the parameter component track; when the component type field is set to a target preset value, the type of the component in the parameter component track indicates a parameter set;

the header type field is configured for indicating a type of a parameter set comprised in the parameter component track; if the header type field is a first set value, the type of the parameter set comprised in the parameter component track indicates the attribute parameter set; if the header type field is a second set value, the type of the parameter set comprised in the parameter component track indicates a geometry parameter set; if the header type field is a third set value, the type of the parameter set comprised in the parameter component track indicates both a geometry parameter set and the attribute parameter set;

the attribute header quantity field is configured for indicating a quantity of attribute parameter sets comprised in each sample in the parameter component track; an order of the attribute parameter sets comprised in the sample is consistent with an order of identifiers of the attribute parameter sets or types of the attribute parameter sets indicated in the component information box;

the reference attribute type field is configured for indicating a type of attribute data for which a current attribute parameter set is effective; if the reference attribute type flag field is a first preset value, the current attribute parameter set is only effective for one specific type of attribute data in a current sample; if the reference attribute type flag field is a second preset value, the current attribute parameter set is effective for a specific group of attribute data in the current sample;

the reference attribute identifier field is configured for indicating an identifier of attribute data corresponding to the current attribute parameter set;

the reference attribute type field is configured for indicating a type of the attribute data corresponding to the current attribute parameter set; and the current attribute parameter set refers to the attribute parameter set being used, and the current sample refers to a sample being decoded.

16. The data processing method according to claim 6, wherein:

the component type field is configured for indicating a type of a component in the parameter component track; if the component type field is a target set value, the type of the component in the parameter component track indicates a parameter set;

the parameter setting type quantity field is configured for indicating a quantity of parameter sets comprised in the parameter component track; and the parameter setting type field is configured for indicating a type of the parameter sets comprised in the parameter component track; if the parameter setting type field is a first preset value, the type of the parameter sets comprised in the parameter component track indicates attribute parameter sets; if the parameter setting type field is a second preset value, the type of the parameter sets comprised in the parameter component track indicates geometry parameter sets; and if the parameter setting type field is a third preset value, the type of the parameter sets comprised in the parameter component track indicates sequence parameter sets.

17. A data processing apparatus for point cloud media, comprising:

at least one memory configured to store program code;

at least one processor configured to read the program code and operate as instructed by the program code, the program code comprising:

obtaining code configured to cause at least one of the at least one processor to obtain a media file of point cloud media, the media file comprising a point cloud code stream of the point cloud media, an attribute parameter set, attribute parameter set indication information, a track, and a subsample information box, wherein the attribute parameter set comprises parameter information required by decoding of attribute data in the point cloud code stream, the attribute parameter set being encapsulated in the subsample information box, wherein the attribute parameter set indication information indicates an encapsulation position of the attribute parameter set, the attribute parameter set indication information representing the subsample information box, and the attribute parameter set indication information indicating a relationship between the attribute parameter set and the attribute data in the point cloud code stream, wherein the track comprises one or more samples divided into one or more subsamples, each sample corresponding to a point cloud frame in the point cloud media, and each subsample comprising a type of point cloud data wherein the subsample information box comprises at least one of a payload type field, a reference attribute information flag field, a reference attribute type flag field, a reference attribute identifier field, or a reference attribute type field; and processing code configured to cause at least one of the at least one processor to decode the point cloud code stream according to the attribute parameter set indication information to present the point cloud media.

18. A non-transitory computer-readable storage medium, storing computer code which, when executed by at least one processor, causes the at least one processor to at least:

obtain a media file of point cloud media, the media file comprising a point cloud code stream of the point cloud media, an attribute parameter set, attribute parameter set indication information, a track, and a subsample information box, wherein the attribute parameter set comprises parameter information required by decoding of attribute data in the point cloud code stream, the attribute parameter set being encapsulated in the subsample information box, wherein the attribute parameter set indication information indicates an encapsulation position of the attribute parameter set, the attribute parameter set indication information representing the subsample information box, and the attribute parameter set indication information indicating a relationship between the attribute parameter set and the attribute data in the point cloud code stream, wherein the track comprises one or more samples divided into one or more subsamples, each sample corresponding to a point cloud frame in the point cloud media, and each subsample comprising a type of point cloud data, wherein the subsample information box comprises at least one of a payload type field, a reference attribute information flag field, a reference attribute type flag field, a reference attribute identifier field, or a reference attribute type field; and decode the point cloud code stream according to the attribute parameter set indication information to present the point cloud media.

* * * * *